US012811747B2

(12) United States Patent
Bar-Or Tillinger et al.

(10) Patent No.: US 12,811,747 B2
(45) Date of Patent: Nov. 24, 2026

(54) SOUNDING REFERENCE SIGNAL CONFIGURATIONS FOR FAST BEAMFORMING REFINEMENT AND MULTIPLE-INPUT MULTIPLE-OUTPUT SUPPORT

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 18/753,472

(22) Filed: Jun. 25, 2024

(65) Prior Publication Data

US 2025/0392428 A1 Dec. 25, 2025

(51) Int. Cl.

| | |
|---|---|
| ***H04W 72/1268*** | (2023.01) |
| ***H04B 7/0452*** | (2017.01) |
| ***H04L 5/00*** | (2006.01) |
| ***H04W 72/1273*** | (2023.01) |
| ***H04W 72/231*** | (2023.01) |

(52) U.S. Cl.

CPC ......... *H04L 5/0051* (2013.01); *H04B 7/0452* (2013.01); *H04W 72/1268* (2013.01); *H04W 72/1273* (2013.01); *H04W 72/231* (2023.01)

(58) Field of Classification Search

CPC ... H04L 5/0051; H04L 5/0023; H04L 5/0048; H04L 5/0053; H04L 5/0094; H04B 7/0452; H04B 7/0628; H04W 72/1268; H04W 72/1273; H04W 72/231

See application file for complete search history.

(56) References Cited

U.S. PATENT DOCUMENTS 11,153,872 B2 * 10/2021 Huang ...................... H04L 5/10
11,711,798 B2 * 7/2023 Kim ...................... H04L 5/0053 370/329
2018/0324788 A1 * 11/2018 Choi ..................... H04L 5/1469
(Continued)

FOREIGN PATENT DOCUMENTS

WO WO-2023137721 A1 * 7/2023 ......... H04L 27/2602

OTHER PUBLICATIONS

G. Noh, B. Hui and I. Kim, "High Speed Train Communications in 5G: Design Elements to Mitigate the Impact of Very High Mobility," in IEEE Wireless Communications, vol. 27, No. 6, pp. 98-106, Dec. 2020 (Year: 2020).*
(Continued)

*Primary Examiner* — Aaron N Strange
(74) *Attorney, Agent, or Firm* — QUALCOMM Incorporated

(57) ABSTRACT

Various aspects of the present disclosure generally relate to wireless communication. In some aspects, a user equipment (UE) may receive, from a network node, an indication of a slot format for a slot, wherein the slot format includes one or more sounding reference signal (SRS) symbols prior to one or more physical uplink shared channel (PUSCH) symbols or one or more physical downlink shared channel (PDSCH) symbols. The UE may transmit an SRS in the one or more SRS symbols of the slot in accordance with the slot format. Numerous other aspects are described.

20 Claims, 14 Drawing Sheets

(56) References Cited

U.S. PATENT DOCUMENTS

| | | | | |
|---|---|---|---|---|
| 2019/0149269 | A1* | 5/2019 | Chatterjee | H04L 5/0094 370/329 |
| 2019/0312665 | A1* | 10/2019 | Jo | H04L 27/2607 |
| 2019/0342898 | A1* | 11/2019 | Nam | H04W 72/0446 |
| 2020/0267764 | A1* | 8/2020 | Rastegardoost | H04W 74/006 |
| 2020/0287676 | A1* | 9/2020 | Jo | H04B 7/0626 |
| 2021/0037554 | A1* | 2/2021 | Kim | H04L 5/0092 |
| 2021/0143948 | A1* | 5/2021 | Choi | H04L 5/0012 |
| 2021/0168770 | A1* | 6/2021 | Oh | H04L 5/0053 |
| 2021/0314195 | A1* | 10/2021 | Lin | H04L 25/0226 |
| 2021/0409178 | A1* | 12/2021 | Faxér | H04L 5/0053 |
| 2022/0104216 | A1* | 3/2022 | Wu | H04W 72/535 |
| 2023/0049137 | A1* | 2/2023 | Ren | H04L 5/0053 |
| 2023/0140402 | A1* | 5/2023 | Chou | H04L 5/0048 370/329 |
| 2023/0143578 | A1* | 5/2023 | Lin | H04L 5/0094 370/329 |
| 2023/0145355 | A1* | 5/2023 | Lin | H04L 5/14 370/278 |
| 2023/0147579 | A1* | 5/2023 | Go | H04L 1/08 370/329 |
| 2023/0171072 | A1* | 6/2023 | Ibrahim | H04L 5/0048 370/329 |
| 2023/0246765 | A1* | 8/2023 | Rico Alvarino | H04L 5/0048 370/330 |
| 2024/0187174 | A1* | 6/2024 | Frenne | H04L 5/0048 |
| 2025/0175951 | A1* | 5/2025 | Wang | H04W 72/0446 |
| 2025/0392428 | A1* | 12/2025 | Bar-Or Tillinger | H04B 7/0452 |
| 2026/0046918 | A1* | 2/2026 | He | H04W 28/0278 |

OTHER PUBLICATIONS

H. Lee and Y.C. Ko, “Physical Layer Enhancements for Ultra-Reliable Low-Latency Communications in 5G New Radio Systems,” in IEEE Communications Standards Magazine, vol. 5, No. 4, pp. 112-122, Dec. 2021 (Year: 2021).*

* cited by examiner

SOUNDING REFERENCE SIGNAL CONFIGURATIONS FOR FAST BEAMFORMING REFINEMENT AND MULTIPLE-INPUT MULTIPLE-OUTPUT SUPPORT

FIELD OF THE DISCLOSURE

Aspects of the present disclosure generally relate to wireless communication and specifically relate to techniques, apparatuses, and methods for sounding reference signal configurations for fast beamforming refinement and multi-use multiple-input multiple-output support.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a user equipment (UE) for wireless communication. The UE may include one or more memories and one or more processors coupled to the one or more memories. The one or more processors may be configured to cause the UE to receive, from a network node, an indication of a slot format for a slot, wherein the slot format includes one or more sounding reference signal (SRS) symbols prior to one or more physical uplink shared channel (PUSCH) symbols or one or more physical downlink shared channel (PDSCH) symbols. The one or more processors may be configured to cause the UE to transmit an SRS in the one or more SRS symbols of the slot in accordance with the slot format.

Some aspects described herein relate to a network node for wireless communication. The network node may include one or more memories and one or more processors coupled to the one or more memories. The one or more processors may be configured to cause the network node to transmit, to a UE, an indication of a slot format for a slot, wherein the slot format includes one or more SRS symbols prior to one or more PUSCH symbols or one or more PDSCH symbols. The one or more processors may be configured to cause the network node to receive, from the UE, an SRS in the one or more SRS symbols of the slot in accordance with the slot format.

Some aspects described herein relate to a method of wireless communication performed by a UE. The method may include receiving, from a network node, an indication of a slot format for a slot, wherein the slot format includes one or more SRS symbols prior to one or more PUSCH symbols or one or more PDSCH symbols. The method may include transmitting an SRS in the one or more SRS symbols of the slot in accordance with the slot format.

Some aspects described herein relate to a method of wireless communication performed by a network node. The method may include transmitting, to a UE, an indication of a slot format for a slot, wherein the slot format includes one or more SRS symbols prior to one or more PUSCH symbols or one or more PDSCH symbols. The method may include receiving, from the UE, an SRS in the one or more SRS symbols of the slot in accordance with the slot format.

Some aspects described herein relate to a non-transitory computer-readable medium that stores a set of instructions for wireless communication by a UE. The set of instructions, when executed by one or more processors of the UE, may cause the UE to receive, from a network node, an indication of a slot format for a slot, wherein the slot format includes one or more SRS symbols prior to one or more PUSCH symbols or one or more PDSCH symbols. The set of instructions, when executed by one or more processors of the UE, may cause the UE to transmit an SRS in the one or more SRS symbols of the slot in accordance with the slot format.

Some aspects described herein relate to a non-transitory computer-readable medium that stores a set of instructions for wireless communication by a network node. The set of instructions, when executed by one or more processors of the network node, may cause the network node to transmit, to a UE, an indication of a slot format for a slot, wherein the slot format includes one or more SRS symbols prior to one or more PUSCH symbols or one or more PDSCH symbols. The set of instructions, when executed by one or more processors of the network node, may cause the network node to receive, from the UE, an SRS in the one or more SRS symbols of the slot in accordance with the slot format.

Some aspects described herein relate to an apparatus for wireless communication. The apparatus may include means for receiving, from a network node, an indication of a slot format for a slot, wherein the slot format includes one or more SRS symbols prior to one or more PUSCH symbols or one or more PDSCH symbols. The apparatus may include means for transmitting an SRS in the one or more SRS symbols of the slot in accordance with the slot format.

Some aspects described herein relate to an apparatus for wireless communication. The apparatus may include means for transmitting, to a UE, an indication of a slot format for a slot, wherein the slot format includes one or more SRS symbols prior to one or more PUSCH symbols or one or more PDSCH symbols. The apparatus may include means for receiving, from the UE, an SRS in the one or more SRS symbols of the slot in accordance with the slot format.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
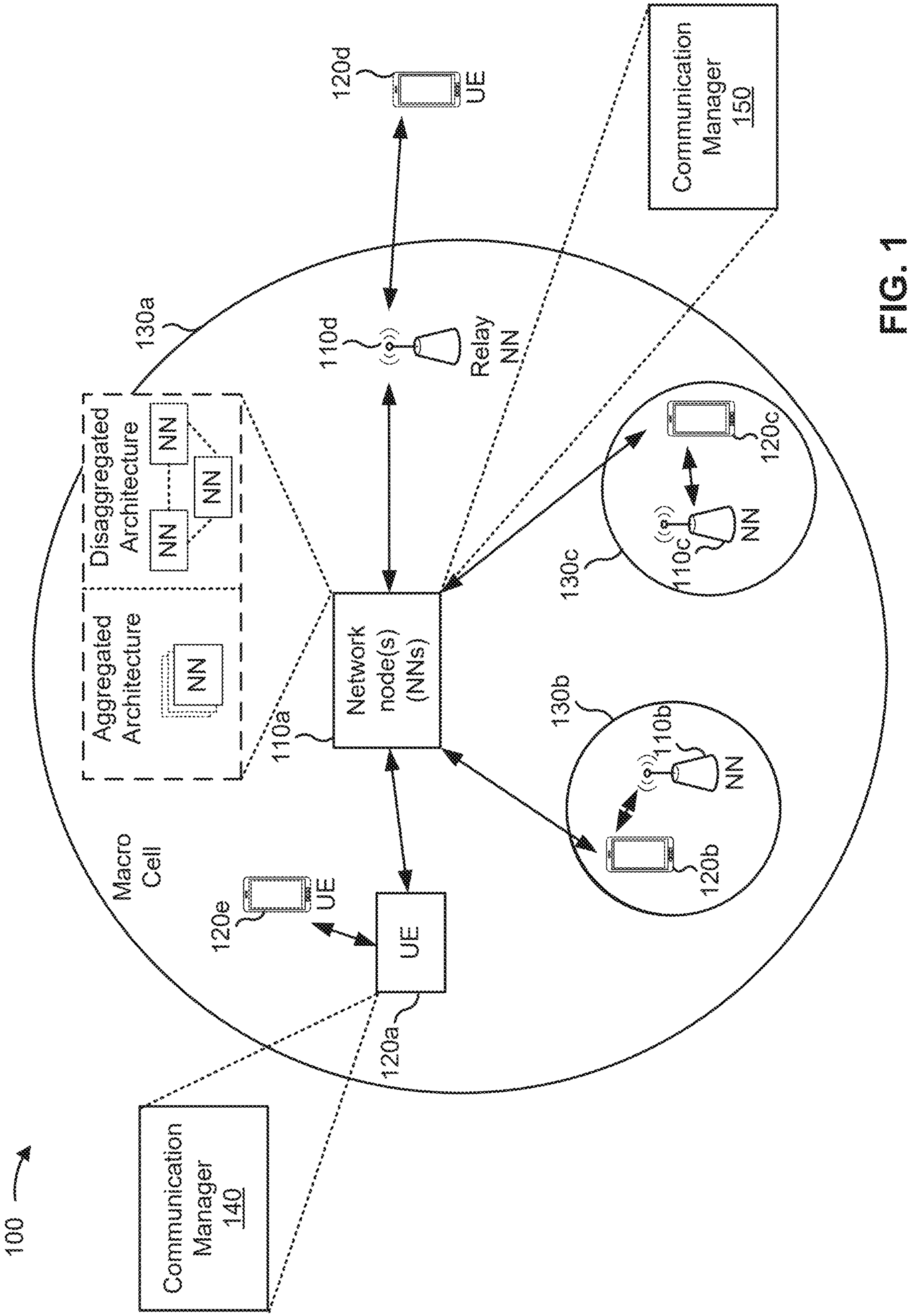
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Beamforming and massive multiple-input multiple-output (MIMO) are technologies that may be used to improve spectral efficiency in wireless communications. Such technologies may use large antenna arrays at a network node side that enable an increase in user signal-to-noise ratio (SNR), an increase in a number of streams (e.g., rank) per user equipment (UE) in single-user MIMO (SU-MIMO), and/or an increase in a number of simultaneously spatially multiplexed (e.g., spatially division multiplexed (SDMed)) UEs in multi-user MIMO. In some examples, beamforming may rely on a closed loop report and precoding. In such examples, UE measurements (e.g., channel measurements) may be derived from channel state information (CSI) reference signals (CSI-RSs) and reported to a network node as channel state feedback (CSF) carried via uplink communications.

In some examples, while an increase of the SU-MIMO rank may be limited by the number of receive (Rx) antennas at the UE side and the form factor of the UE (e.g., the proximity between the Rx antennas of the UE may reduce the supported rank due to high spatial correlation between the Rx antennas), an increase of the MU-MIMO order (e.g., the number of simultaneously spatially multiplexed UEs) supported in a cell may provide a significant increase to the overall cell capacity, as the MU-MIMO order is limited only by the number of transmit (Tx) antennas at the network node (e.g., and not the number of UE side Rx antennas). However, MU-MIMO may be highly dependent on an updated pre-coding/beamforming matrix at the network node Tx side. That is MU-MIMO may require updated channel knowledge of the channel from each of the Tx antennas of the network node to the Rx antennas of each of the SDMed UEs.

In some examples, uplink channel conditions may be measured by a network node based at least in part on sounding reference signals (SRSs) transmitted from antennas of one or more UEs. In such examples, uplink beamforming at the network node may be based at least in part on the SRSs. In some examples, for a time-division duplexing (TDD) cell where channel reciprocity may be assumed, downlink beamforming at the network node may also be based at least in part on the SRSs. For example, for MU-MIMO communications in the TDD cell, the channel knowledge at the network node may be based at least in part on uplink channel measurements performed by the network node on SRSs transmitted from antennas of various UEs. However, latency between the transmission of an SRS and the beamformed communications (e.g., uplink and/or downlink communications) that are based on the SRS may result in changing channel conditions and/or UE mobility.

Various aspects relate generally to SRS configurations and/or slot formats. Some aspects more specifically relate to SRS configurations and/or slot formats that support fast beamforming refinement and MU-MIMO. In some aspects, a UE may receive, from a network node, an indication of a slot format for a slot. The slot format may include one or more SRS symbols prior to one or more physical uplink shared channel (PUSCH) symbols or one or more physical downlink shared channel (PDSCH) symbols. The UE may transmit an SRS in the one or more SRS symbols of the slot in accordance with the slot format. In some examples, the slot format may include the one or more SRS symbols prior to the one or more PUSCH symbols, and the UE may transmit an uplink communication in the one or more PUCCH symbols of the slot. In such examples, the network node may perform beamforming for receiving the uplink communication based at least in part on the SRS transmitted by the UE in the one or more SRS symbols. In some examples, the slot format may include the one or more SRS symbols prior to the one or more PDSCH symbols, and the UE may receive a downlink communication in the one or more PDSCH symbols of the slot. In such examples, the network node may perform beamforming for transmitting the downlink communication based at least in part on the SRS transmitted by the UE in the one or more SRS symbols. In some examples, the SRS may be an aperiodic SRS, and the UE may receive downlink control information (DCI) indicating scheduling information and a frequency bandwidth for the SRS. For example, the frequency bandwidth for the SRS may correspond to an MU-MIMO PDSCH frequency allocation associated with the UE. In some examples, the one or more SRS symbols in the slot format may include at least one SRS symbol in a downlink band associated with a frequency-division duplexing (FDD) cell.

Particular aspects of the subject matter described in this disclosure can be implemented to realize one or more of the following potential advantages. In some examples, by indicating/configuring a slot format that includes one or more SRS symbols prior to one or more PUSCH or PDSCH symbols and enabling the UE to transmit an SRS in the one or more SRS symbols in accordance with the slot format, the described techniques can be used to reduce/minimize the latency between the SRS transmission and the corresponding uplink (e.g., PUSCH) and/or downlink (e.g., PDSCH) communications for which beamforming at the network node is performed based at least in part on the SRS transmission. Reducing the latency between the SRS transmission and the corresponding uplink and/or downlink communication may enable fast beamforming refinement, resulting in increased SNR for communications with a UE in cases of UE mobility. Reducing the latency between the SRS transmission and the corresponding uplink and/or downlink communication may also enable an increase of the MU-MIMO order and/or improve MU-MIMO resiliency to UE mobility.

In some examples, by indicating the frequency bandwidth for an aperiodic SRS (e.g., a frequency bandwidth corresponding to an MU-MIMO PDSCH frequency allocation associated with the UE) via DCI, the described techniques can be used to reduce frequency resources allocated per SRS and further reduce the latency between the SRS transmission and the corresponding uplink (e.g., PUSCH) and/or downlink (e.g., PDSCH) communications for which beamforming at the network node is performed based at least in part on the SRS transmission. As a result, the MU-MIMO order may be further increases and/or MU-MIMO resiliency to UE mobility may be further improved.

In some examples, by indicating/configuring a slot format that includes at least one SRS symbol in a downlink band associated with an FDD cell and enabling the UE to transmit the SRS in the at least one SRS symbol in the downlink band in accordance with the slot format, the described techniques can be used to enable to the network node to extract a channel response for a downlink channel based at least in part on the SRS in an FDD cell where reciprocity between the downlink and uplink channels may not be assumed.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point, a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC)

functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (IFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic arca (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit DCI (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more PDSCHs. Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more PUSCHs. The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve TDD, in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve FDD, in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive, from a network node, an indication of a slot format for a slot, wherein the slot format includes one or more SRS symbols prior to one or more PUSCH symbols or PDSCH symbols; and transmit an SRS in the one or more SRS symbols of the slot in accordance with the slot format. Additionally, or alternatively, the communication manager 140 may perform one or more other operations described herein.

In some aspects, the network node 110 may include a communication manager 150. As described in more detail elsewhere herein, the communication manager 150 may transmit, to a UE, an indication of a slot format for a slot, wherein the slot format includes one or more SRS symbols prior to one or more PUSCH symbols or PDSCH symbols; and receive, from the UE, an SRS in the one or more SRS symbols of the slot in accordance with the slot format. Additionally, or alternatively, the communication manager 150 may perform one or more other operations described herein.

As indicated above, FIG. 1 is provided as an example. Other examples may differ from what is described with regard to FIG. 1.

Figure 2:
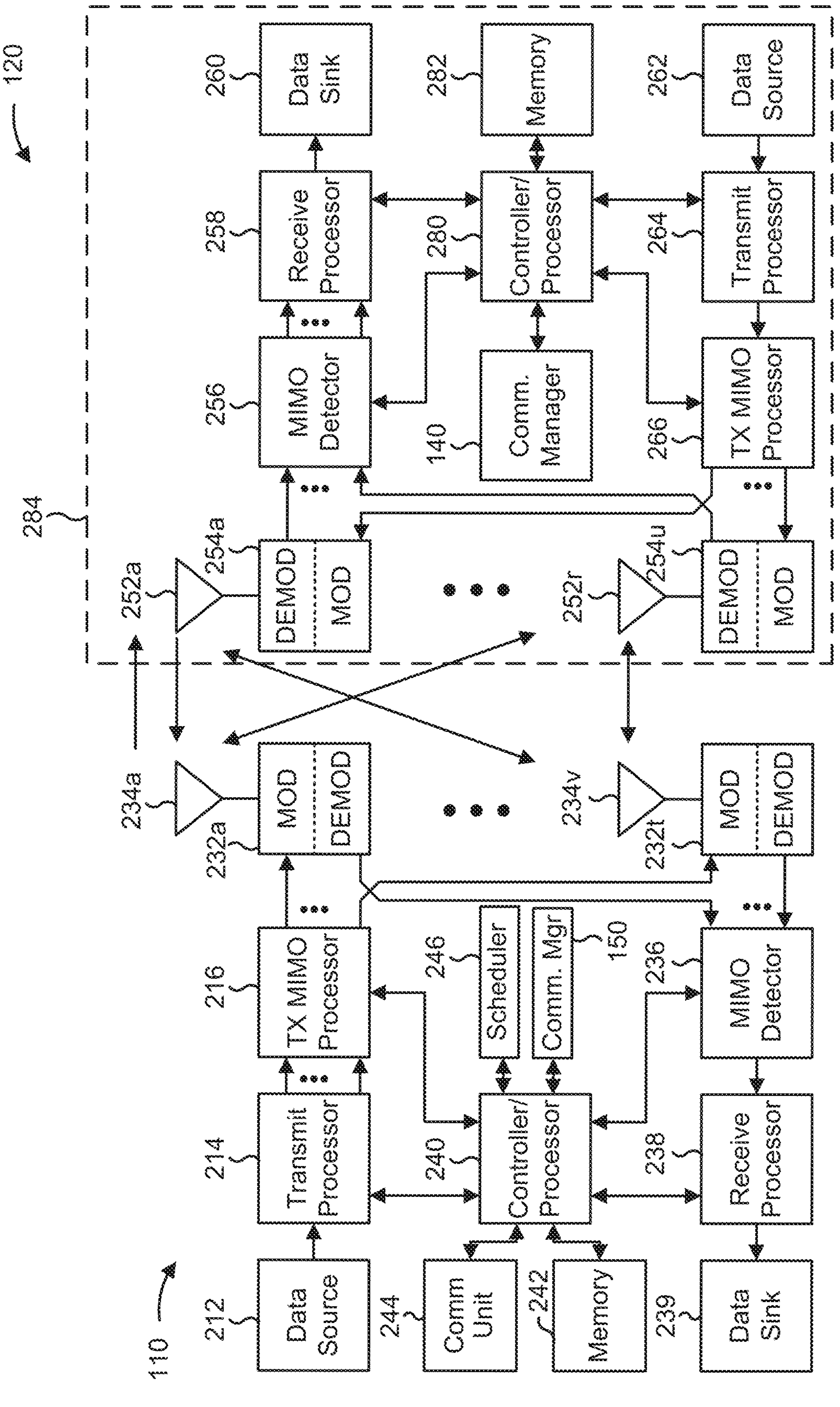
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a CSI-RS) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter.

In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
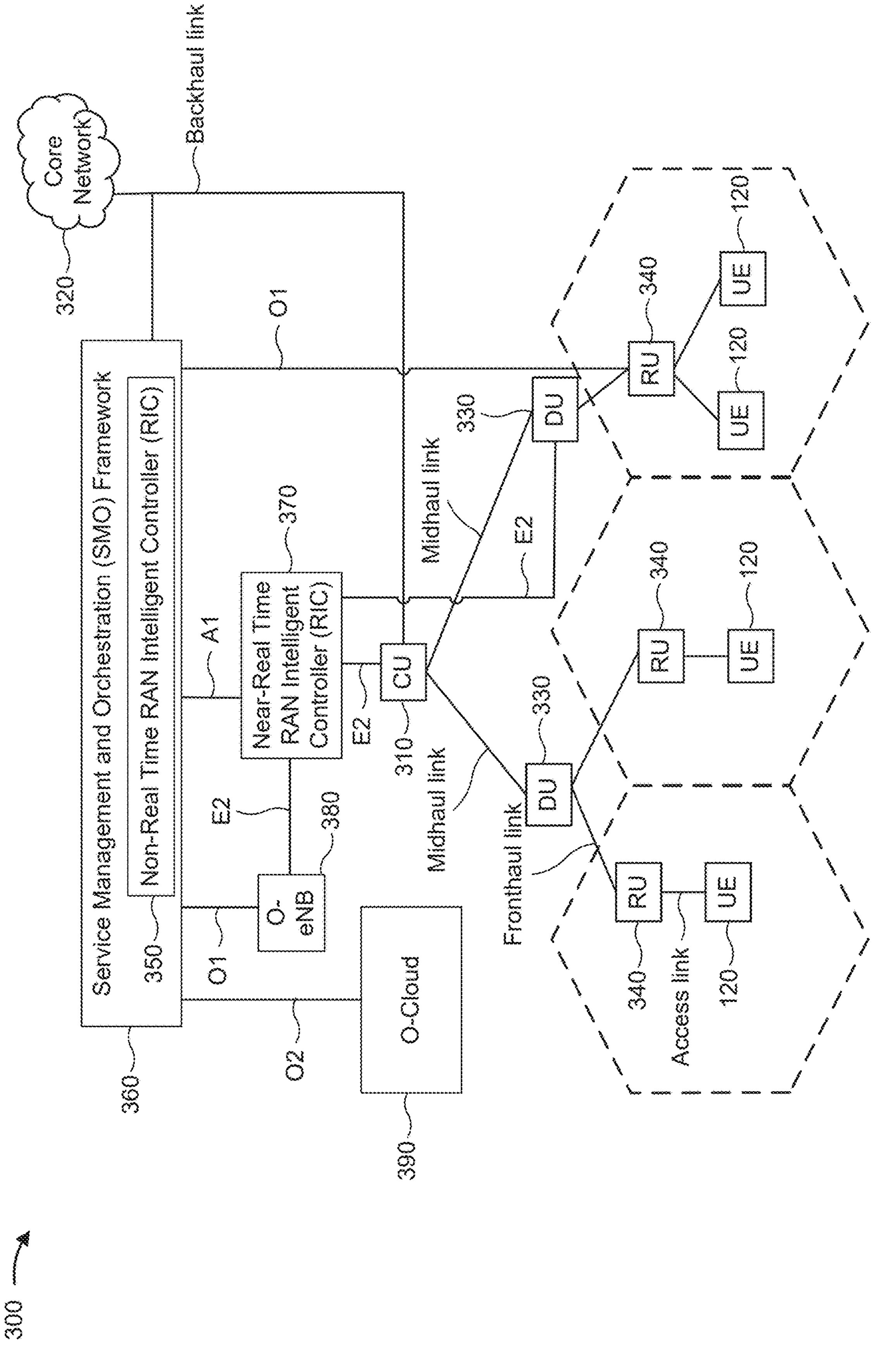
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-NB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with SRS configurations for fast beamforming refinement and MU-MIMO support, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 700 of FIG. 7, process 800 of FIG. 8, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 700 of FIG. 7, process 800 of FIG. 8, or other processes as described herein. In some examples, executing instructions may include running the instructions, converting the instructions, compiling the instructions, and/or interpreting the instructions, among other examples.

In some aspects, the UE 120 includes means for receiving, from a network node, an indication of a slot format for a slot, wherein the slot format includes one or more SRS symbols prior to one or more PUSCH symbols or one or more PDSCH symbols; and/or means for transmitting an SRS in the one or more SRS symbols of the slot in accordance with the slot format. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, an indication of a slot format for a slot, wherein the slot format includes one or more SRS symbols prior to one or more PUSCH symbols or one or more PDSCH symbols; and/or means for receiving, from the UE, an SRS in the one or more SRS symbols of the slot in accordance with the slot format. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4A:
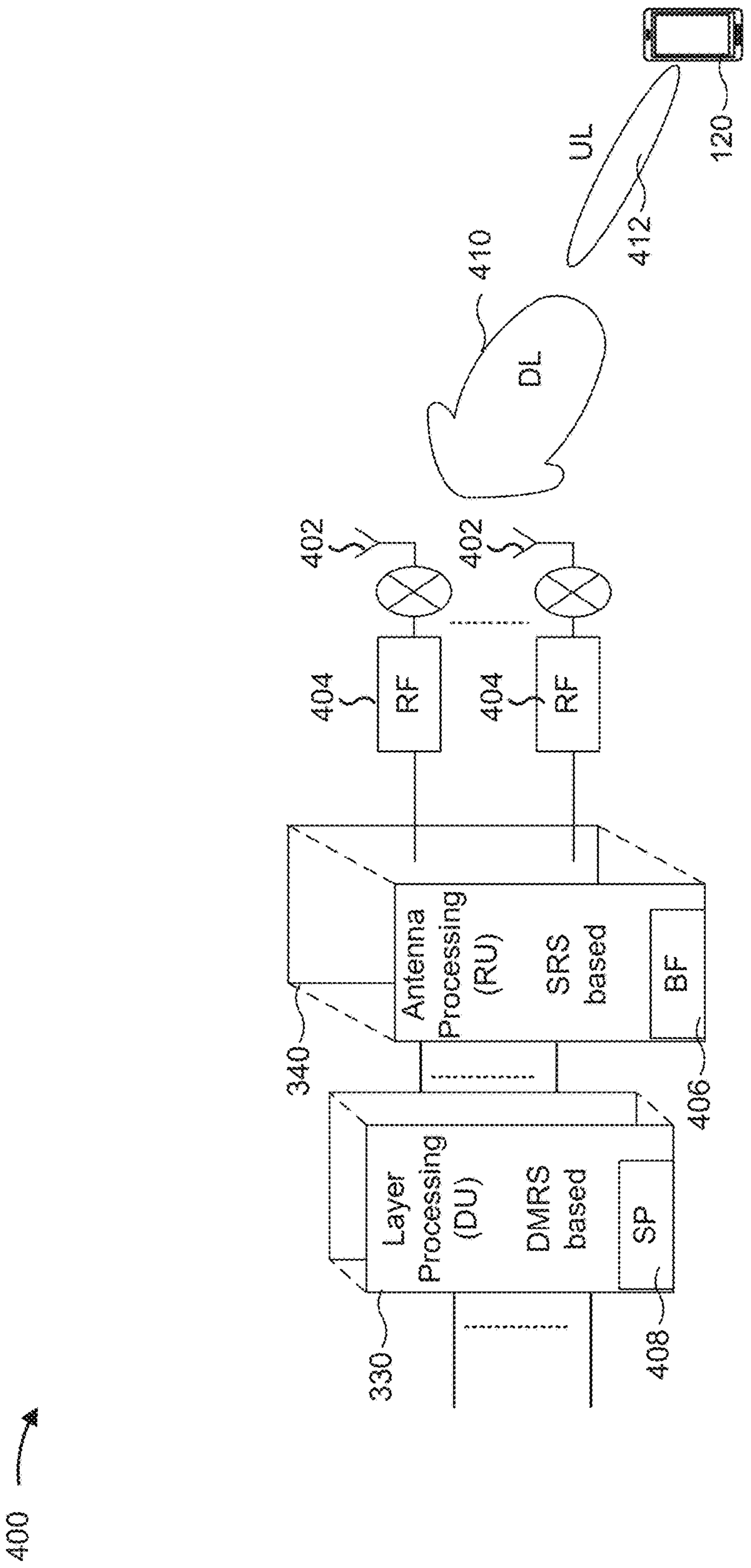
FIGS. 4A-4B are diagrams illustrating examples associated with downlink and uplink beamforming, in accordance with the present disclosure.
Figure 4B:
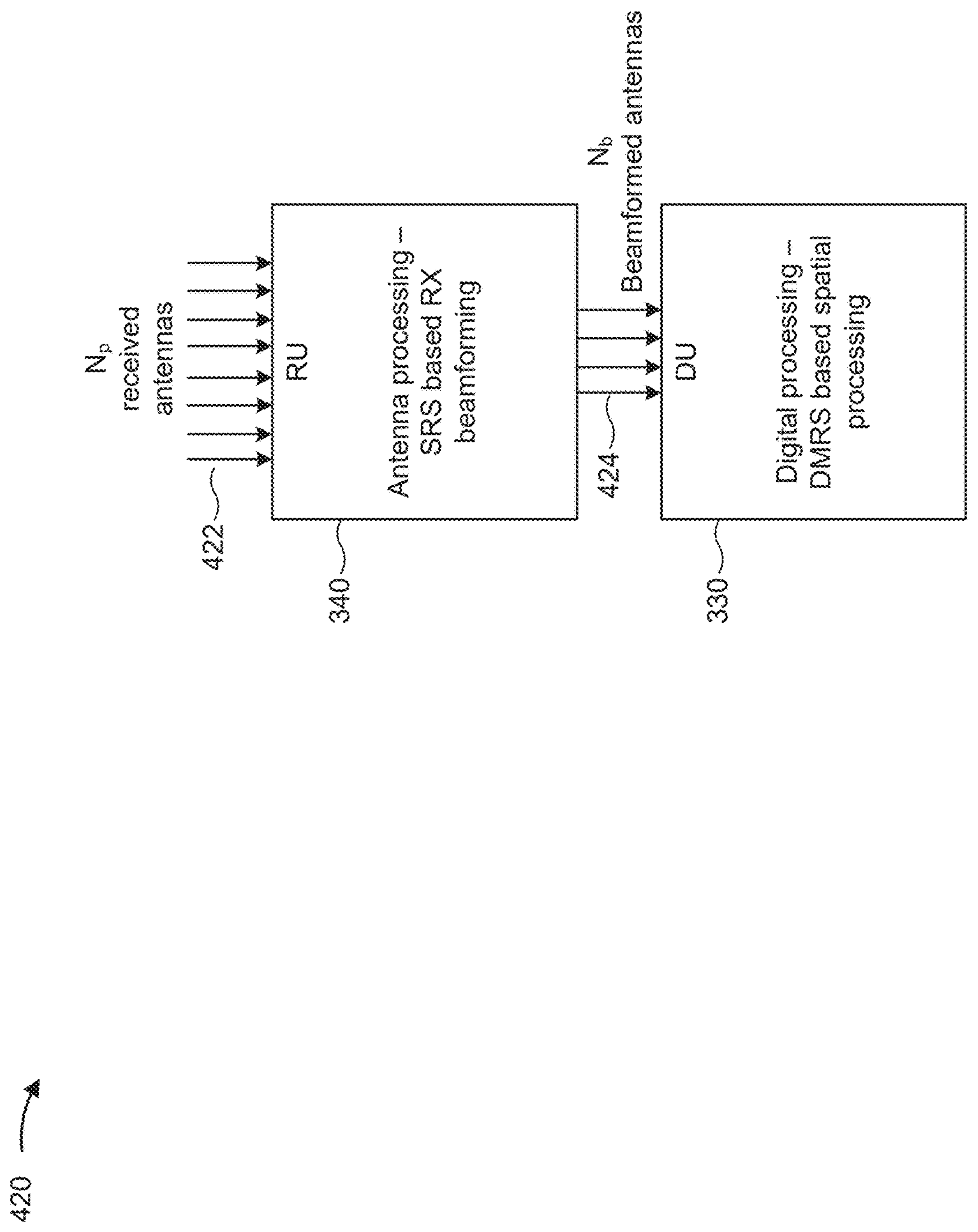

FIGS. 4A-4B are diagrams illustrating examples associated with downlink and uplink beamforming, in accordance with the present disclosure.

As shown in FIG. 4A, example 400 includes an RU 340 and a DU 330. The RU 340 may include a set of antennas 402 and a set of respective RF chains 404. For example, the set of antennas 402 may include or be included in one or more antenna arrays. The RU 340 may perform antenna processing for receiving uplink communications and transmitting downlink communications. For example, the antenna processing may include processing antenna signals received via the antennas 402 for uplink communications and/or antenna signals to be transmitted via the antennas 402 for downlink communications. In some examples, the antenna processing may be based at least in part on SRSs received from one or more UEs. As shown by reference number 406, the antenna processing may include beamforming (shown in FIG. 4A as "BF"). For example, the RU 340 may perform Rx beamforming for uplink communications (e.g., to determine Rx beams for receiving uplink communications) and/or Tx beamforming for downlink communications (e.g., to determine Tx beams for transmitting downlink communications). In some examples, the RU 340 may perform the beamforming for uplink communications and/or for downlink communications based at least in part on the SRSs received from the one or more UEs. For example, the RU 340 may perform the uplink beamforming using the SRS, and the RU 340 may perform the downlink beamforming using the SRS or using UE feedback (e.g., CSI included in a CSI report). The DU 330 may perform layer processing for uplink and downlink communications. In some examples, the layer processing may be based at least in part on DMRSs received via uplink communications and/or DMRSs transmitted via downlink communications. As shown by reference number 408, the layer processing may include spatial processing (shown in FIG. 4A as "SP"). For example, the spatial processing may include DMRS-based spatial processing.

In some examples, there may be an asymmetry between downlink and uplink. Larger antenna arrays enable narrower beams, which may improve the achievable SNR, but may also impose challenges on beam management and limit the UE mobility that can be supported. Wider beams may increase support for higher UE mobility and reduce the complexity associated with beam management. However, wider beams may have a lower achievable array gain (e.g., due to a lower array size), which may be compensated for by a higher total radiated power (TRP) by utilizing stronger power amplifiers (PAs). However, increasing the PA power may be limited in the uplink direction due to the UE form factor and battery constraints. Accordingly, in some example, a sufficient TRP to compensate for the lower achievable array gain associated with a wide beam may only be achieved in the downlink direction by increasing the PA power in the transmitter of a network node (e.g., the RU 340). As a result, practical deployments may suffer from extended asymmetry between downlink and uplink. For example, in some practical deployments, the asymmetry may be unresolved and preserved by either sacrificing uplink performance when using wider beams or by limiting UE mobility while incorporating narrower beams.

In some aspects, a UE may receive, from a network node, an indication of a slot format for a slot. The slot format may include one or more SRS symbols prior to one or more PUSCH symbols or one or more PDSCH symbols. The UE may transmit an SRS in the one or more SRS symbols of the slot in accordance with the slot format. The UE may transmit an uplink communication in the one or more PUSCH symbols of the slot in accordance with the slot format, or the UE may receive a downlink communication in the one or more PDSCH symbols of the slot in accordance with the slot format. Accordingly, the SRS may be transmitted as a prefix to the uplink communication in the PUSCH symbols or the downlink communication in the PDSCH symbols. As a result, the latency between the SRS transmission and the uplink or downlink communication may be minimized or reduced, which enables fast beamforming refinement. In some aspects, such fast beamforming refinement may be used to enable the network node (e.g., the RU 340 and/or the DU 330) to utilize wide downlink beams (e.g., with high TRP) while utilizing narrow uplink beams (e.g., compensating for the UE TRP limitation). Such fast beamforming refinement may enable the network node (e.g., the RU 340 and/or the DU 330) to switch between the wide downlink beams and the narrow uplink beams while avoiding or reducing beam management control loop latency. As shown in FIG. 4A, the RU 340 may use a wide beam 410 (e.g., a wide Tx beam) to transmit a downlink communication to a UE 120, and the UE 120 may use a narrow beam 412 to transmit an uplink communication to the RU 340. In some aspects, fast beamforming refinement based at least in part SRS transmissions from a UE may enable a network node (e.g., the RU 340) to use a wide beam (e.g., a wide Tx beam) to transmit a downlink communication to the UE and a narrow beam (e.g., a narrow Rx beam) to receive an uplink communication from the UE. For example, the network node may use the network node may use the wide Tx beam to transmit the downlink communication and the narrow Rx beam to receive the uplink communication, regardless of the Tx beam used by the UE to transmit the uplink communication.

As shown in example 420 of FIG. 4B, uplink reception processing at a network node (e.g., a gNB) may be split between the RU 340 and the DU 330. The RU 340 may receive $N_p$ physical antennas 422 (e.g., $N_p$ antenna signals from the set of antennas), and the RU 340 may perform antenna processing including Rx beamforming from the $N_p$ physical antennas 422 (e.g., the $N_p$ received antenna signals) to $N_b$ beamformed antennas 424 (e.g., $N_b$ beamformed antenna signals), where $N_p>N_b$. The Rx beamforming may be based at least in part on an SRS received from a UE. The RU 340 may transmit the $N_b$ beamformed antennas 424 (e.g., the $N_b$ beamformed antenna signals) to the DU 330. The DU 330 may receive the $N_b$ beamformed antennas 424 (e.g., the $N_b$ beamformed antenna signals) from the RU 340, and the DU 330 may perform digital processing of the baseband signal using the $N_b$ beamformed antennas 424 (e.g., the $N_b$ beamformed antenna signals). For example, the digital processing of the baseband signal may include DMRS-based spatial processing (e.g., layer processing).

In some examples, the RU 340 may measure the channel (e.g., the uplink channel) based on the SRS over the full antenna set of the RU 340. In some examples, the RU 340 may perform the Rx beamforming using a hybrid beamforming in which the uplink Rx beamforming reduces the signal to a lower number of layers. In such examples, the UE DMRS and data are then processed by the DU 330 on the reduced number of layers. This may reduce processing performed by the DU 330 and fronthaul throughput.

As indicated above, FIGS. 4A-4B are provided as examples. Other examples may differ from what is described with respect to FIGS. 4A-4B.

Figure 5A:
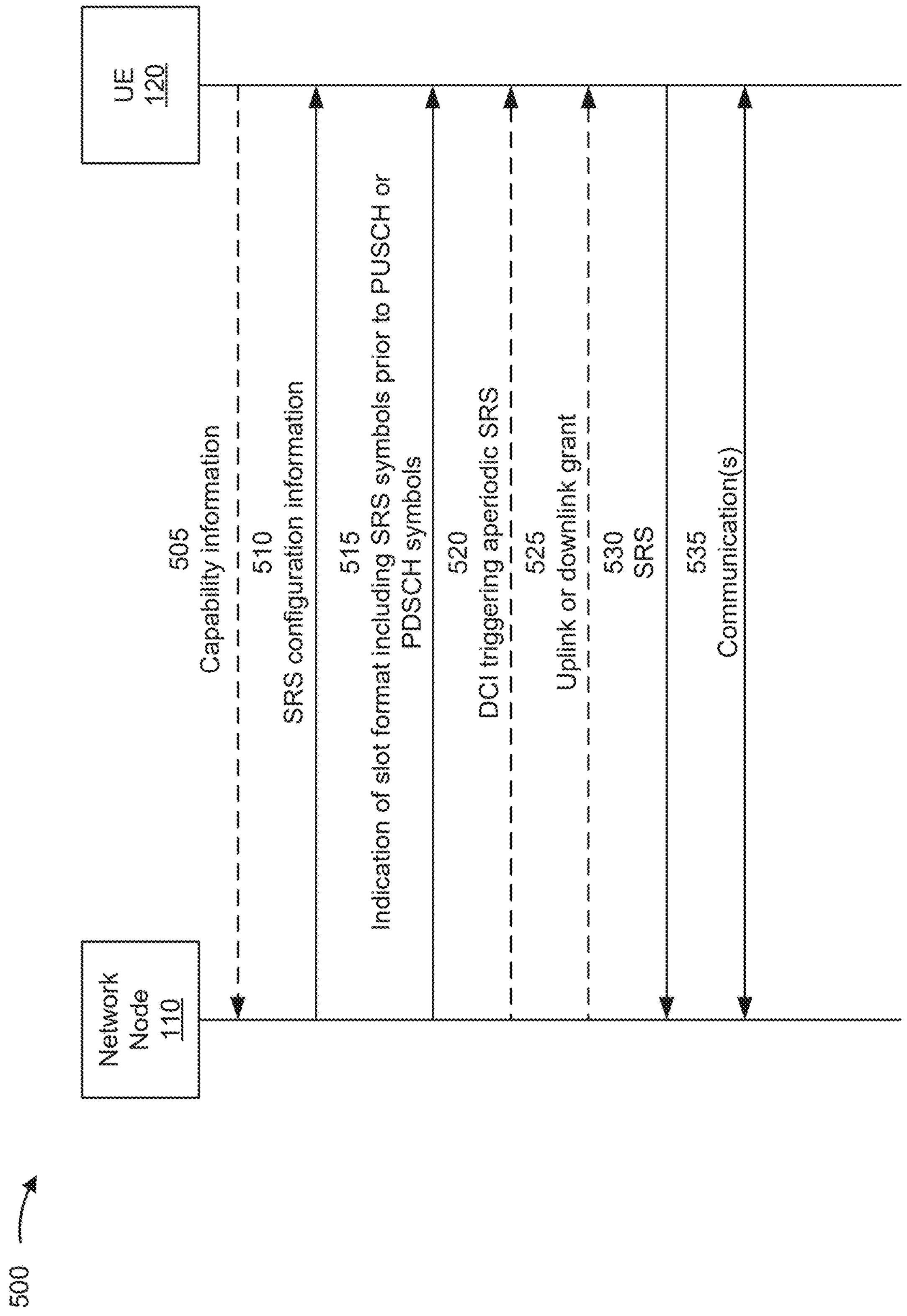
FIGS. 5A-5C are diagrams illustrating examples associated with sounding reference signal (SRS) configurations for fast beamforming refinement and multi-user multiple-input multiple-output (MU-MIMO) support, in accordance with the present disclosure.
Figure 5B:
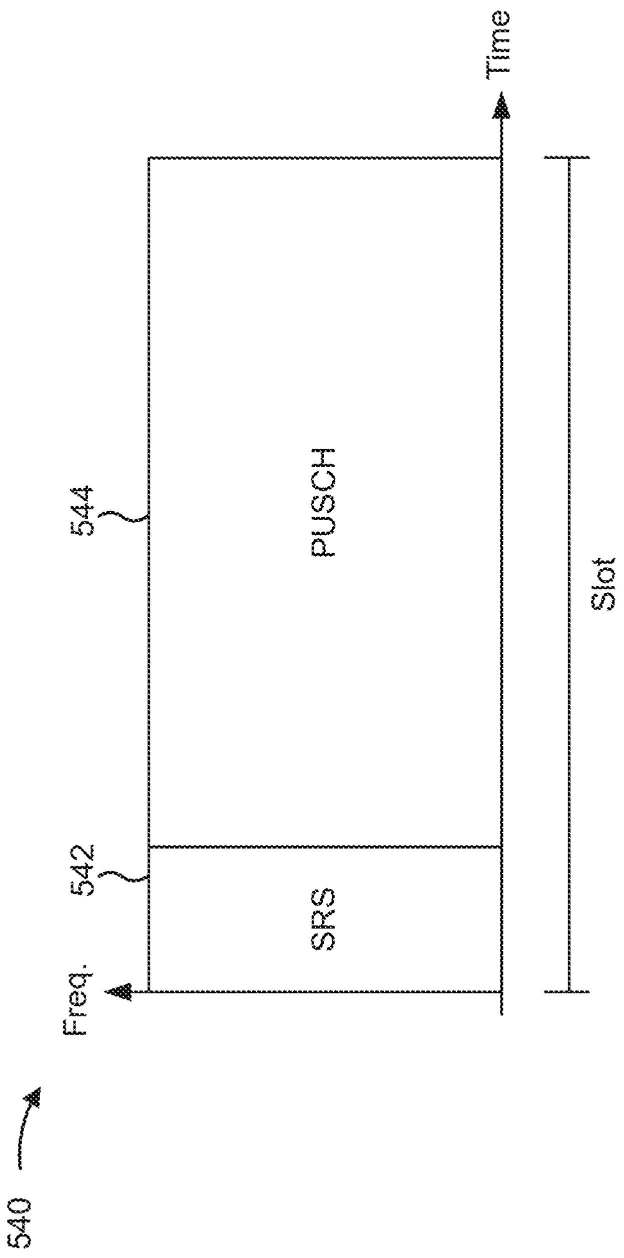
Figure 5C:
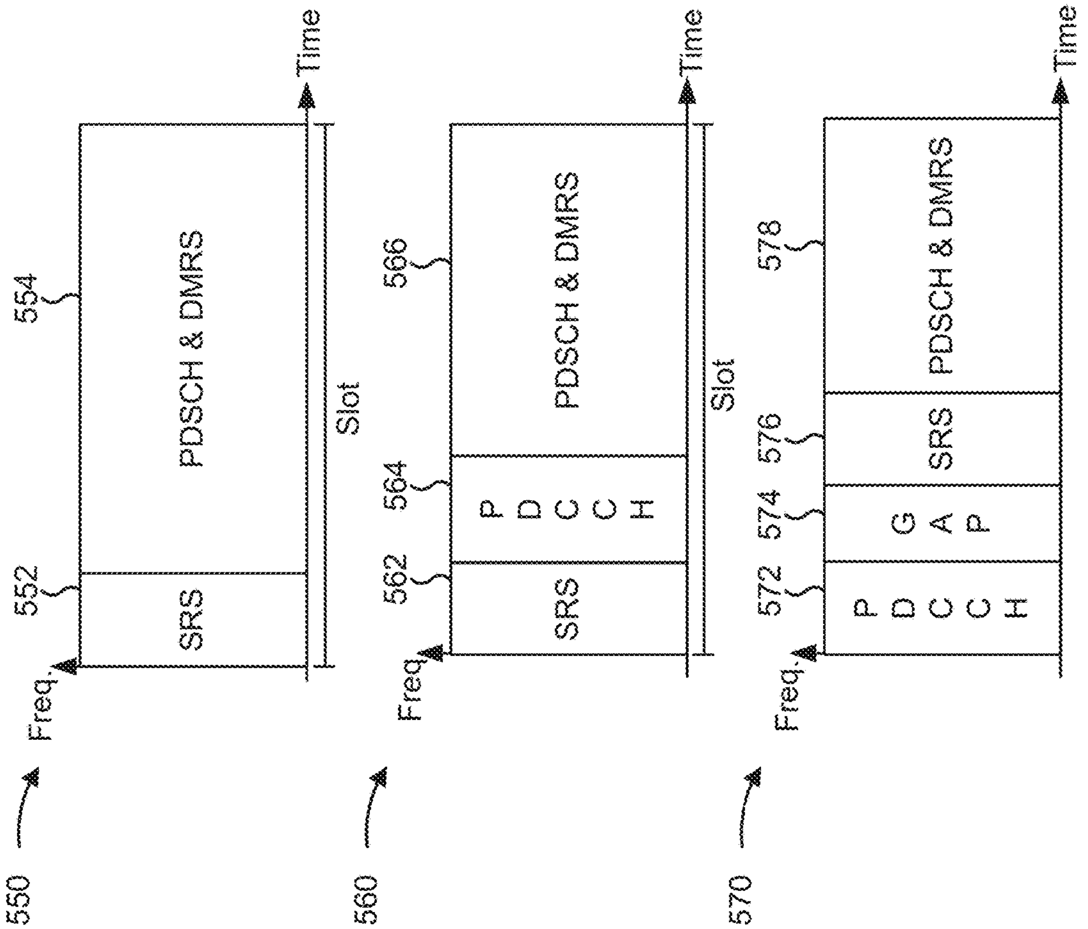

FIGS. 5A-5C are diagrams illustrating examples associated with SRS configurations for fast beamforming refinement and MU-MIMO support, in accordance with the present disclosure. As shown in FIG. 5A, example 500 includes communication a network node 110 (e.g., an RU, a DU, a CU, and/or a base station) and a UE 120. In some aspects, the network node 110 and the UE 120 may be part of a wireless communication network (e.g., wireless communication network 100). The UE 120 and the network node 110 may have established a wireless connection prior to operations shown in FIG. 5A. The network node 110 and the UE 120 may communicate via a wireless access link, which may include an uplink and a downlink.

As shown in FIG. 5A, and by reference number 505, in some aspects, the UE 120 may transmit, and the network node 110 may receive, capability information. The capability information may indicate whether the UE 120 supports a feature and/or one or more parameters related to the feature. For example, the capability information may indicate a capability and/or parameter associated with SRS transmission by the UE 120. One or more operations described herein may be based on capability information. For example, the UE may perform a communication in accordance with the capability information, or may receive configuration information that is in accordance with the capability information.

In some aspects, the capability information may indicate a capability of the UE 120 for transmitting an SRS in a downlink band (e.g., a downlink frequency band) of an FDD cell. For example, the UE 120 may transmit capability information associated with transmitting an SRS in a downlink band of an FDD cell in a case in which the UE 120 is in an FDD cell (e.g., a cell associated with the network node 110 is an FDD cell). In some examples, the capability information may indicate whether the UE 120 supports SRS transmission in a downlink band of the FDD cell and/or whether the UE 120 supports SRS transmission in the downlink band during uplink transmission in an uplink band (e.g., an uplink frequency band) of the FDD cell. For example, the capability information may indicate that the UE 120 does not support SRS transmission over the downlink band of the FDD cell, that the UE 120 supports SRS transmission over the downlink band of the FDD cell only without other transmissions over the uplink band of the FDD cell, or that the UE 120 supports SRS transmission over the downlink band of the FDD cell unconditionally (e.g., the UE 120 supports SRS transmission over the downlink at the same time as another uplink transmission over the uplink band).

As further shown in FIG. 5A, and by reference number 510, the network node 110 may transmit, and the UE 120 may receive, SRS configuration information. In some aspects, the UE 120 may receive the SRS configuration information via RRC signaling. Additionally, or alternatively, the UE 120 may receive the SRS configuration information via system information (e.g., a master information block (MIB) and/or a system information block (SIB), among other examples), one or more MAC-CEs, and/or DCI, among other examples.

The SRS configuration information may indicate a configuration for one or more SRSs. In some aspects, the SRS configuration information may indicate a configuration for a periodic SRS. In such examples, the SRS configuration information may indicate scheduling information for the periodic SRS, a bandwidth configuration for the periodic SRS, an SRS sequence for the periodic SRS, and/or other SRS parameters associated with the periodic SRS. The scheduling information for the periodic SRS may include a periodicity of the periodic SRS and/or timing information (e.g., a time offset) associated with a first transmission of the periodic SRS. The bandwidth configuration for the periodic SRS may indicate frequency resources (e.g., a frequency bandwidth) to be used for transmitting the periodic SRS.

In some aspects, the SRS configuration information may indicate a configuration for an aperiodic SRS. In some examples, the SRS configuration for the aperiodic SRS may indicate a bandwidth configuration for the aperiodic SRS (e.g., a frequency bandwidth to be used for transmitting the aperiodic SRS when the aperiodic SRS is triggered), an SRS sequence for the aperiodic SRS, and/or SRS other parameters associated with the aperiodic SRS. In some examples, as discussed in greater detail in connection with FIG. 6B, the SRS configuration included in the SRS configuration information received via RRC signaling may not include the bandwidth configuration for the aperiodic SRS. In such examples, the frequency bandwidth for the SRS may be dynamically indicated (e.g., via DCI) in dynamic signaling that triggers the aperiodic SRS. In such examples, other SRS parameters, such as the SRS sequence and/or other parameters, may still be included in the SRS configuration information that is received by the UE 120 via RRC signaling.

In some aspects, the SRS configuration information may include configurations for multiple SRSs (e.g., one or more periodic SRSs and/or one or more aperiodic SRSs). In some aspects, the network node 110 may transmit, and the UE 120 may receive, one or more subsequent indications selecting, activating, deactivating, and/or triggering one or more of the SRSs configured in the SRS configuration information. In some examples, the one or more subsequent indications may include one or more dynamic indications (e.g., via DCI or MAC-CE) that trigger one or more aperiodic SRSs. In some examples, the one or more subsequent indications may include subsequent RRC signaling or one or more dynamic indications (e.g., via MAC-CE or DCI) that select, activate, and/or deactivate one or more periodic SRSs.

As further shown in FIG. 5A, and by reference number 515, the network node 110 may transmit, and the UE 120 may receive, an indication of a slot format that includes one or more SRS symbols prior to one or more PUSCH symbols or one or more PDSCH symbols. The indication of the slot format may indicate that the slot format is to be used for one or more slots. In some aspects, the indication of the slot format may be transmitted by the network node 110, and received by the UE 120, via one or more RRC signaling, system information (e.g., an MIB or an SIB, among other examples), one or more MAC-CEs, and/or DCI, among other examples.

In some aspects, the indication of the slot format may be included in semi-static configuration information received (e.g., via RRC signaling or system information) by the UE 120. In some examples, the configuration information may indicate a configuration of the slot format (e.g., an allocation of the symbols in a slot in accordance with the slot format) and/or timing information associated with the slot format (e.g., an indication of one or more slots in which the slot format is to be applied). In some examples, the configuration information may indication configurations of multiple different slot formats including the slot format and/or timing information (e.g., a slot format timing pattern) that indicates when (e.g., in which slots) the different slot formats are to be applied. In such examples, the multiple different slot formats may include multiple slot formats that include one or more SRS symbols prior to one or more PUSCH symbols or one or more PDSCH symbols, such as all or a subset of the slot formats described in connection with FIGS. 5B-5C and/or elsewhere herein. In some examples, the configuration information may indicate a selection of the slot format (and/or one or more other slot formats) from a set of pre-configured slot formats and/or timing information associated with the selected slot format(s). In such examples, the set of pre-configured slot formats may be specified in a wireless communication standard (e.g., a 3GPP wireless communication standard). For example, the set of pre-configured slot formats (e.g., specific in the wireless communication standard) may include one or more slot formats that include one or more SRS symbols prior to one or more PUSCH symbols or one or more PDSCH symbols (e.g., one or more or the slot formats discussed in connection with FIGS. 5B-5C and/or elsewhere herein).

In some aspects, the indication of the slot format may be a dynamic indication (e.g., received via DCI or MAC-CE) that the slot format is to be used for one or more slots. In some examples, the dynamic indication of the slot format may indicate a selection of the slot format from multiple slot formats configured in semi-static configuration information (e.g., via RRC signaling or system information). In some examples, the dynamic indication of the slot format may indicate a selection of the slot format from multiple pre-configured slot formats. For example, the multiple pre-configured slot formats may be specified in a wireless communication standard (e.g., a 3GPP wireless communication standard).

In some aspects, the slot format may include one or more SRS symbols prior to one or more PUSCH symbols. FIG. 5B shows an example slot format 540 that includes one or more SRS symbols 542 prior to one or more PUSCH symbols 544. For example, the slot format 540 may be used for an uplink slot. As shown in FIG. 5B, in the slot format 540, the one or more SRS symbols 542 may be a first number of symbols starting from a beginning of a slot, and the one or more PUSCH symbols 544 may be the remaining symbols after the one or more SRS symbols 542 in the slot. For example, the slot format 540 may include $N_{SRS}$ SRS symbols 542 (e.g., $N_{SRS}$=1 or 2) starting at the beginning of the slot, followed by $N_{PUSCH}$ PUSCH symbols 542 (e.g., $N_{PUSCH}$=a remaining number symbols, other than the $N_{SRS}$ SRS symbols, in the slot). The one or more SRS symbols 542 may be dedicated for SRS transmission, and the one or more PUSCH symbols may be used for uplink (e.g., PUSCH and/or PUCCH) communications and/or uplink DMRS transmissions.

In some aspects, the slot format 540 shown in FIG. 5B enables transmission, by the UE 120 in the one or more SRS symbols 542, of an SRS that may be used as a prefix for any uplink transmission (e.g., PUSCH transmission) in the one or more PUSCH symbols 544. In this way, the slot format 540 may enable fast refinement for uplink beamforming by the network node 110. For example, the SRS appended to the uplink slot (e.g., the SRS transmitted in the one or more SRS symbols 542 of the slot format 540) may be used by the network node 110 to perform fast refinement of uplink beamforming for the UE 120 that is applicable to the OFDM symbols that follow (e.g., the PUSCH symbols 544). This may enable an asymmetric beam configuration in which the network node 110 uses wide Tx beams for downlink and narrow Rx beams for uplink (e.g., to support UE mobility while maintaining a link budget). In some aspects, the slot format 540 shown in FIG. 5B may also enable the network node 110, by exploiting channel reciprocity (e.g., in a TDD cell), to use the SRS received in the one or more SRS symbols 542 to refine a downlink beam for a downlink communication to the UE 120 in one or more subsequent slots (e.g., one or more slots subsequent to the slot in which the slot format 540 is applied). In such examples, the refined Rx beam for the SRS at the network node 110 may also be used as the downlink beam (e.g., the Tx beam) for transmitting the downlink communication to the UE 120.

In some aspects, the slot format may include one or more SRS symbols prior to one or more PDSCH symbols. FIG. 5C shows example slot formats 550, 560, and 570 that include one or more SRS symbols prior to one or more PDSCH symbols. For example, the slot format 550, the slot format 560, or the slot format 570 may be used for a downlink slot. The slot formats 550, 560, and 570 each enable transmission of an SRS by the UE 120 over one or more SRS symbols prior to the PDSCH symbols. In this way, the slot formats 550, 560, and 570 enable the network node 110 to perform MU-MIMO precoder calculation for the UE 120 (and/or for one or more other UEs) using a most updated channel estimation, with a minimal gap between the precoder calculation based on the SRS transmission and the PDSCH communication to which the precoder calculation is applied.

As shown in FIG. 5C, the slot format 550 includes one or more SRS symbols 552, starting at the beginning of the slot, followed by one or more PDSCH symbols 554. For example, the slot format 550 may include $N_{SRS}$ SRS symbols 552 (e.g., $N_{SRS}$=1 or 2) starting at the beginning of the slot, followed by $N_{PDSCH}$ PDSCH symbols 562. The one or more SRS symbols 552 may be dedicated for SRS transmission, and the one or more PDSCH symbols 554 (shown as "PDSCH & DMRS in FIG. 5C) may be used for downlink (e.g., PDSCH) transmission and/or DMRS transmission. For example, the one or more PDSCH symbols 554 may include PDSCH and/or DMRS symbols. In an example in which the slot format 550 is used, SRS parameters for an SRS transmitted in the one or more SRS symbols 552 (e.g., in the case of an aperiodic SRS) and PDSCH parameters for a PDSCH communication scheduled in the one or more PDSCH slots 554 may be carried by DCI (e.g., in one or more PDCCH transmissions) during one or more previous slots.

As further shown in FIG. 5C, the slot format 560 includes one or more SRS symbols 562, starting at the beginning of the slot, one or more PDCCH symbols 564 subsequent to the one or more SRS symbols 562, and one or more PDSCH symbols 566 subsequent to the one or more PDCCH symbols 564. For example, the slot format 560 may include $N_{SRS}$ SRS symbols 562 (e.g., $N_{SRS}$=1 or 2) starting at the beginning of the slot, followed by $N_{PDCCH}$ PDCCH symbols 564, followed by $N_{PDSCH}$ PDSCH symbols 566. The one or more SRS symbols 562 may be dedicated for SRS transmission, the one or more PDCCH symbols 564 may be dedicated for PDCCH transmission, and the one or more PDSCH symbols 566 (shown as "PDSCH & DMRS in FIG. 5C) may be used for PDSCH transmission and/or DMRS transmission. For example, the one or more PDSCH symbols 566 may include PDSCH and/or DMRS symbols. In an example in which the slot format 560 is used, SRS parameters for an SRS transmitted in the one or more SRS symbols 562 (e.g., in the case of an aperiodic SRS) may be carried by DCI (e.g., in a PDCCH transmission) in one or more previous slots. In such an example in which the slot format 560 is used, PDSCH parameters for a PDSCH communication scheduled in the one or more PDSCH slots 566 may be carried by DCI (e.g., in a PDCCH transmission) received in the one or more PDCCH symbols 564 or received during one or more previous slots.

As further shown in FIG. 5C, the slot format 570 includes one or more PDCCH symbols 572, starting at the beginning of the slot, a gap symbol 574 (e.g., for downlink-uplink compensation) subsequent to the one or more PDCCH symbols 572, one or more SRS symbols 576 subsequent to the gap symbol 574, and one or more PDSCH symbols 578 subsequent to the one or more SRS symbols 576. For example, the slot format 570 may include $N_{PDCCH}$ PDCCH symbols 572, starting at the beginning of the slot, followed by at least one gap symbol 574, followed by $N_{SRS}$ SRS symbols 576 (e.g., $N_{SRS}$=1 or 2), followed by $N_{PDSCH}$ PDSCH symbols 578. The one or more PDCCH symbols 572 may be dedicated for PDCCH transmission, the one or more SRS symbols 576 may be dedicated for SRS transmission, and the one or more PDSCH symbols 578 (shown as "PDSCH & DMRS in FIG. 5C) may be used for PDSCH transmission and/or DMRS transmission. For example, the one or more PDSCH symbols 578 may include PDSCH and/or DMRS symbols. The gap symbol 574 may provide a time gap to allow the UE 120 to switch from downlink reception to uplink transmission (e.g., the transmit the SRS). In an example in which the slot format 570 is used, SRS parameters for an SRS transmitted in the one or more SRS symbols 576 (e.g., in the case of an aperiodic SRS) may be carried by DCI (e.g., in a PDCCH transmission) received in the one or more PDCCH symbols 572 or received in one or more previous slots. In such an example in which the slot format 570 is used, PDSCH parameters for a PDSCH communication scheduled in the one or more PDSCH slots 578 may be carried by DCI (e.g., in a PDCCH transmission) received in the one or more PDCCH symbols 572 or received during one or more previous slots.

Returning to FIG. 5A, in some aspects, the slot format may include at least one SRS symbol in a downlink band associated with an FDD cell. For FDD cells, reciprocity between the downlink channel and the uplink channel may not be assumed. In some examples, an FDD cell may be configured with one or more downlink bands (e.g., downlink frequency bands) for downlink communications and one or more uplink bands (e.g., uplink frequency bands) for uplink communications. However, in some examples, in FDD cells, an SRS may only be transmitted over the uplink band, and therefore a network node may not be able to extract the channel response for the downlink channel using an SRS. In some aspects, by configuring/indicating a slot format (or multiple slot formats) that includes one or more SRS symbols in a downlink band (or multiple downlink bands) of an FDD cell, the UE 120 may be enabled to transmit an SRS in the downlink band of the FDD cell, and the network node 110 may be able to process the SRS, under the reciprocity assumption, to extract the downlink channel response based on the SRS.

In some aspects, as discussed above in connection with reference number 505, the UE 120 may transmit, and the network node 110 may receive capability information associated with transmitting an SRS in the downlink band of the FDD cell. For example, the capability information may indicate that the UE 120 does not support SRS transmission over the downlink band of the FDD cell, that the UE 120 supports SRS transmission over the downlink band of the FDD cell only without other transmissions over the uplink band of the FDD cell, or that the UE 120 supports SRS transmission over the downlink band of the FDD cell unconditionally (e.g., the UE 120 supports SRS transmission over the downlink at the same time as another uplink transmission over the uplink band). In such examples, the network node 110 may schedule the SRS transmission (e.g., periodically or aperiodically) and indicate the appropriate configuration for the UE 120 based at least in part on the capability information. For example, the network node 110 may indicate the slot format including the one or more SRS symbols in the downlink band of the FDD cell and/or schedule the SRS transmission in the one or more SRS symbols in the downlink band of the FDD cell based at least in part on the capability information indicating the UE 120 supports SRS transmission over the downlink band of the FDD cell unconditionally or only without other transmissions over the uplink band of the FDD cell.

As further shown in FIG. 5A, and by reference number 520, in some aspects, the network node 110 may transmit, and the UE 120 may receive, DCI triggering an aperiodic SRS. The DCI may include scheduling information for the aperiodic SRS. In some aspects, the DCI may trigger the UE 120 to transmit the aperiodic SRS in the one or more SRS symbols of a slot in accordance with the indicated slot format. That is, the scheduling information may schedule the transmission of the aperiodic SRS in the one or more SRS symbols. In some aspects, as described in greater detail in connection with FIG. 6B, the DCI may also include (e.g., in addition to the scheduling information), a frequency bandwidth for the aperiodic SRS. For example, the DCI may indicate a frequency bandwidth for the SRS that corresponds to a MU-MIMO PDSCH frequency allocation associated with the UE 120.

In some aspects, the DCI triggering the aperiodic SRS in the one or more SRS symbols of a slot in which the indicated slot format is applied, may be transmitted by the network node 110, and received by the UE 120, in a slot previous to the slot in which the slot format is applied or in one or more PDCCH symbols (e.g., prior to the one or more SRS symbols) in the slot in which the slot format is applied. In an example in which the DCI schedules the SRS transmission in the one or more SRS symbols 542 of a slot in which the slot format 540 shown in FIG. 5B is applied, the DCI may be received by the UE 120 in a previous slot. In an example in which the DCI schedules the SRS transmission in the one or more SRS symbols 552 of a slot in which the slot format 550 shown in FIG. 5C is applied, the DCI may be received by the UE 120 in a previous slot. In an example in which the DCI schedules the SRS transmission in the one or more SRS symbols 562 of a slot in which the slot format 560 shown in FIG. 5C is applied, the DCI may be received by the UE 120 in a previous slot. In an example in which the DCI schedules the SRS transmission in the one or more SRS symbols 576 of a slot in which the slot format 570 shown in FIG. 5C is applied, the DCI may be received by the UE 120 in the one or more PDCCH symbols 572 of the slot or in a previous slot.

As further shown in FIG. 5A, and by reference number 525, in some aspects, the network node 110 may transmit, and the UE 120 may receive, an uplink or a downlink grant. For example, the network node 110 may transmit, and the UE 120 may receive, DCI including an uplink grant (e.g., DCI scheduling one or more uplink communications to be transmitted by the UE 120) and/or DCI including a downlink grant (e.g., DCI scheduling one or more downlink transmissions to be received by the UE 120).

In some aspects, the UE 120 may receive (e.g., via DCI) an uplink grant scheduling an uplink communication to be transmitted by the UE 120 in the one or more PUSCH symbols 544 of a slot in which the slot format 540 shown in FIG. 5B is applied. In such examples, the uplink grant may be received by the UE 120 in a slot previous to the slot in which the slot format 540 is applied. In such examples, the uplink grant may transmitted together with (e.g., in the same DCI and/or the same PDCCH transmission) or separate from (e.g., in different DCI and/or different PDCCH transmission) DCI triggering SRS transmission in the one or more SRS symbols 542 of the slot in which the slot format 540 is applied.

In some aspects, the UE 120 may receive (e.g., via DCI) a downlink grant scheduling a downlink communication to be received by the UE 120 in the one or more PDSCH symbols 554 of a slot in which the slot format 550 shown in FIG. 5C is applied. In such examples, the downlink grant may be received by the UE 120 in a slot previous to the slot in which the slot format 550 is applied. In such examples, the downlink grant may transmitted together with (e.g., in the same DCI and/or the same PDCCH transmission) or separate from (e.g., in different DCI and/or different PDCCH transmission) DCI triggering SRS transmission in the one or more SRS symbols 552 of the slot in which the slot format 550 is applied.

In some aspects, the UE 120 may receive (e.g., via DCI) a downlink grant scheduling a downlink communication to be received by the UE 120 in the one or more PDSCH symbols 566 of a slot in which the slot format 560 shown in FIG. 5C is applied. In such examples, the downlink grant may be received by the UE 120 in a slot previous to the slot in which the slot format 560 is applied, or the downlink grant may be received by the UE 120 in the one or more PDCCH symbols 564 of the slot in which the slot format 560 is applied. In such examples, the uplink grant may transmitted together with (e.g., in the same DCI and/or the same PDCCH transmission) or separate from (e.g., in different DCI and/or different PDCCH transmission) DCI triggering SRS transmission in the one or more SRS symbols 562 of the slot in which the slot format 560 is applied.

In some aspects, the UE 120 may receive (e.g., via DCI) a downlink grant scheduling a downlink communication to be received by the UE 120 in the one or more PDSCH symbols 578 of a slot in which the slot format 570 shown in FIG. 5C is applied. In such examples, the downlink grant may be received by the UE 120 in a slot previous to the slot in which the slot format 570 is applied, or the downlink grant may be received by the UE 120 in the one or more PDCCH symbols 572 of the slot in which the slot format 570 is applied. In such examples, the uplink grant may transmitted together with (e.g., in the same DCI and/or the same PDCCH transmission) or separate from (e.g., in different DCI and/or different PDCCH transmission) DCI triggering SRS transmission in the one or more SRS symbols 576 of the slot in which the slot format 570 is applied.

In some aspects, such as aspects in which the DCI that triggers an aperiodic SRS includes a frequency bandwidth for the aperiodic SRS (e.g., as described in greater detail in connection with FIG. 6B), the SRS and/or a downlink (e.g., PDSCH) communication may be scheduled in accordance with slot formats (e.g., legacy slot formats and/or other slot formats) other than those discussed in connection with FIGS. 5B-5C. For example, the network node 110 may schedule an SRS (e.g., via DCI including the frequency bandwidth for the SRS) in a slot (e.g., slot n−1) that is associated with a legacy slot format, and the network node 110 may transit a PDSCH communication in a subsequent slot (e.g., slot n) that is associated with a legacy slot format.

As further shown in FIG. 5A, and by reference number 530, the UE 120 may transmit, and the network node 110 may receive, an SRS in the one or more SRS symbols of a slot in accordance with the indicated slot format. In some aspects, the SRS may be a periodic SRS. In such examples, the UE 120 may transmit the SRS in the one or more SRS symbols using SRS parameters configured for the periodic SRS in the SRS configuration information. In some aspects, the SRS may be an aperiodic SRS. For example the aperiodic SRS may be triggered/scheduled by the DCI triggering the aperiodic SRS discussed in connection with reference number 520. In such examples, the UE 120 may transmit the SRS in the one or more SRS symbols using SRS parameters indicated in the DCI triggering the aperiodic SRS and/or SRS parameters configured for the aperiodic SRS in the SRS configuration information.

In some aspects, the UE 120 may transmit the SRS in the one or more SRS symbols 542 in accordance with the slot format 540 shown in FIG. 5B. In some aspects, the UE 120 may transmit the SRS in the one or more SRS symbols 552 in accordance with the slot format 550 shown in FIG. 5C. In some aspects, the UE 120 may transmit the SRS in the one or more SRS symbols 562 in accordance with the slot format 560 shown in FIG. 5C. In some aspects, the UE 120 may transmit the SRS in the one or more SRS symbols 576 in accordance with the slot format 570 shown in FIG. 5C. In some aspects, the UE 120 may transmit the SRS in one or more SRS symbols in a downlink band associated with an FDD cell.

As further shown in FIG. 5A, and by reference number 535, the network node 110 may communicate with the UE 120 based at least in part on the SRS transmitted in the one or more SRS symbols in accordance with the slot format.

In some aspects, the UE 120 may transmit an uplink (e.g., PUSCH) communication, and the network node 110 may receive the uplink communication based at least in part on the SRS transmitted in the one or more SRS symbols. In some aspects, the UE 120 may transmit the uplink communication in one or more PUSCH symbols that follow the one or more SRS symbols in accordance with the slot format. For example, the UE 120 may transmit the uplink communication in the one or more PUSCH symbols 544 of the slot format 540 shown in FIG. 5B. In such examples, the network node 110 may perform uplink beamforming (e.g., Rx beamforming) for the uplink communication based on the SRS transmitted in the one or more SRS symbols (e.g., the one or more SRS symbols 542). In this way, the slot format 540 may enable fast refinement for uplink beamforming by the network node 110. That is, the network node 110 measure the uplink channel using the SRS, and the network node 110 may receive the uplink communication using an Rx beam determined based on the uplink channel measurement. For example, the network node 110 may perform fast refinement of uplink beamforming for the UE 120 to determine an Rx beam that is applicable to one or more uplink communications transmitted by the UE 120 in the PUSCH symbols to follow the one or more PUSCH symbols. This may enable an asymmetric beam configuration in which the network node 110 uses wide Tx beams for downlink and narrow Rx beams for uplink (e.g., to support UE mobility while maintaining a link budget).

In some aspects, the network node 110 may transmit a downlink (e.g., PDSCH) communication based at least in part on the SRS (e.g., using a Tx beam determined using the SRS), and the UE 120 may receive the downlink communication. in an example in which the one or more SRS slots are followed by the one or more PUSCH slots (such as in the slot format 540 shown in FIG. 5B), the network node 110, may exploit channel reciprocity (e.g., in a TDD cell) to use the SRS received in the one or more SRS symbols to refine a downlink beam (e.g., a Tx beam) for a downlink communication to the UE 120 in one or more subsequent slots. In such examples, the refined Rx beam determined using the SRS may also be used by the network node 110 as the downlink beam (e.g., the Tx beam) for transmitting the downlink communication to the UE 120.

In some aspects, the network node 110 may transmit the downlink communication in one or more PDSCH symbols (e.g., PDSCH symbols 554 in slot format 550, PDSCH symbols 566 in slot format 550, or PDSCH symbols 578 in slot format 570) that follow the one or more SRS symbols (e.g., SRS symbols 552 in slot format 550, SRS symbols 562 in slot format 560, or SRS symbols 576 in slot format 570), in accordance with the slot format. In such examples, the network node 110 may transmit the downlink communication in the one or more PDSCH symbols using a downlink Tx beam determined based at least in part on the SRS received in the one or more SRS symbols. For example, the network node 110 may measure the uplink channel using the SRS, and the network node 110 may determine the downlink Tx beam based on the measured uplink channel by exploiting channel reciprocity. In some aspects, the network node 110 may determine an MU-MIMO precoder for the downlink communication to the UE 120 based at least in part on the SRS, and the network node 110 may transmit the downlink communication to the UE 120 using the MU-MIMO precoder. For example, the network node 110 may calculate the MU-MIMO precoder based at least in part on the most updated channel estimation performed by the network node 110 using the SRS received in the one or more SRS symbols. In such examples, the network node 110 may determine MU-MIMO precoders for downlink communications to multiple UEs (e.g., including the UE 120) based at least in part on SRSs transmitted by the multiple UEs.

In some aspects, the network node 110 may transmit, and the UE 120 may receive, a downlink communication in a downlink band of an FDD cell. In such examples, the network node 110 may perform beamforming for the downlink communication based at least in part on an SRS received by the network node 110 in one or more SRS symbols in the downlink band. For example, the network node 110 may extract a downlink channel response based at least in part on a channel measurement performed using the SRS in the downlink band, and the network node 110 may determine a downlink Tx beam for transmitting the downlink communication to the UE 120 in the downlink band using the downlink channel response extracted based on the SRS.

As indicated above, FIGS. 5A-5C are provided as examples. Other examples may differ from what is described with respect to FIGS. 5A-5C.

Figure 6A:
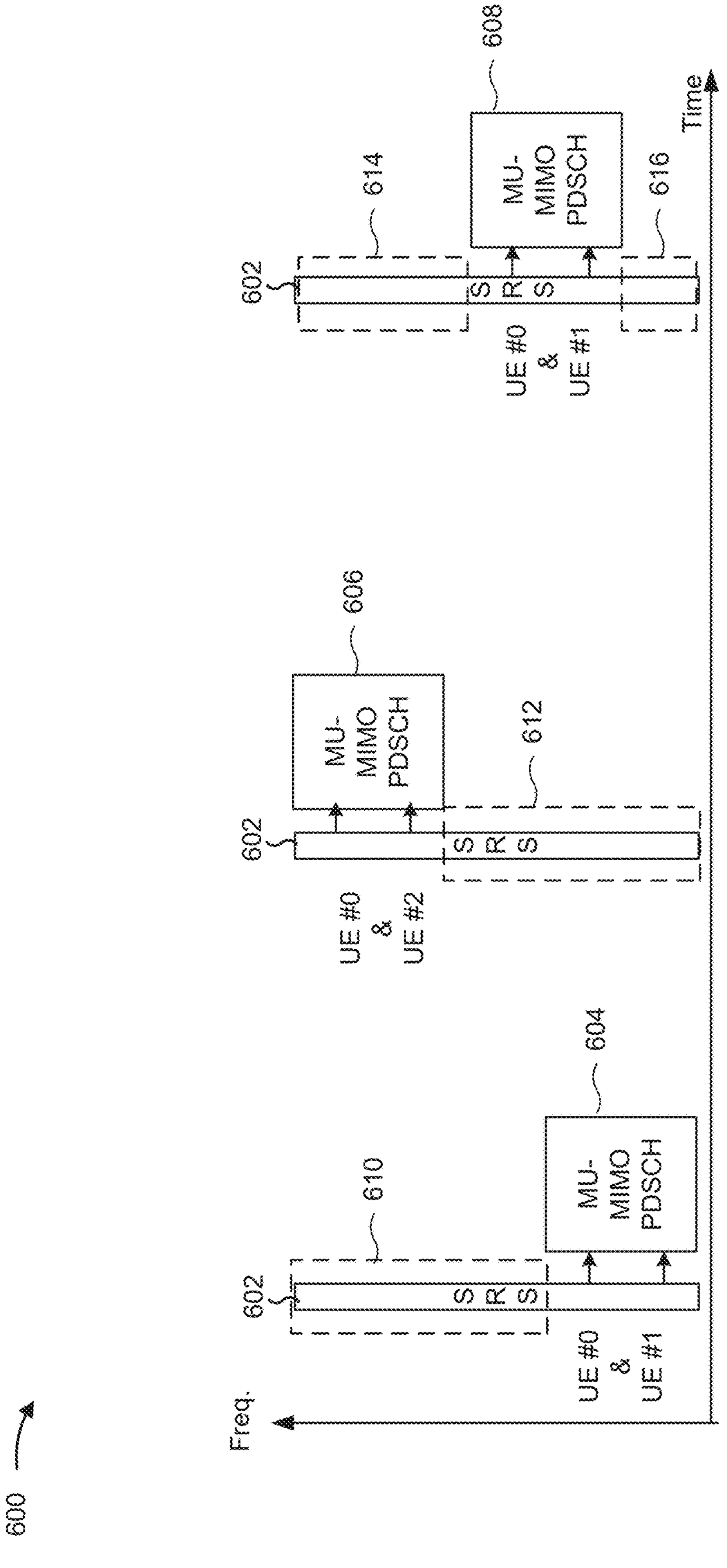
FIGS. 6A-6B are diagrams illustrating examples associated with aperiodic SRS configuration for MU-MIMO support, in accordance with the present disclosure.
Figure 6B:
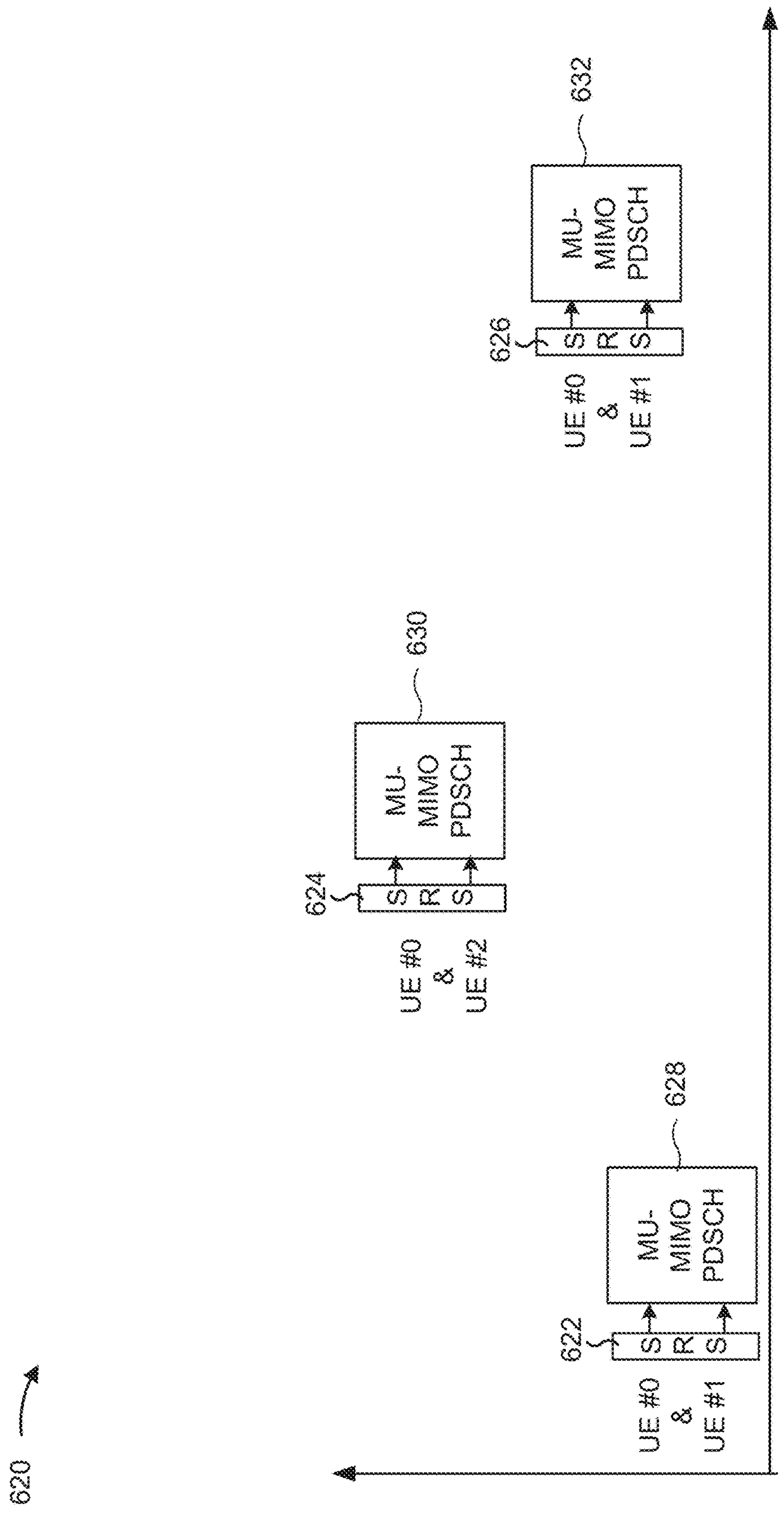

FIGS. 6A-6B are diagrams illustrating examples associated with aperiodic SRS configuration for MU-MIMO support, in accordance with the present disclosure.

A UE (e.g., the UE 120) may be configured with periodic and/or aperiodic SRS configurations. As discussed above in connection with FIGS. 5A and 5C, an SRS transmitted by a UE, prior to a scheduled downlink (e.g., PDSCH) communication to be transmitted to the UE, may be used by a network node (e.g., the network node 110) for calculating a MU-MIMO precoder for the downlink (e.g., PDSCH) communication. In such examples, an aperiodic SRS may be advantageous, as compared with a periodic SRS, because the SRS timing of the periodic SRS may not align with the PDSCH timing scheduled for that UE.

In some examples, such as example 600 shown in FIG. 6A, the bandwidth configuration for an aperiodic SRS may be semi-statically configured for a UE via RRC signaling (e.g., carried in an RRC message), and DCI may be used to trigger (and schedule) transmission of the aperiodic SRS using the bandwidth configuration configured for the aperiodic SRS. In MU-MIMO temporary frequency allocations may be used for PDSCH communications to different UEs. However, in examples in which the bandwidth configured for an aperiodic SRS is semi-statically configured, when the DCI triggers transmission of an aperiodic SRS by a UE, the bandwidth configuration cannot be dynamically adjusted to match the temporary PDSCH frequency allocation for that UE. In addition, the scheduler (e.g., the network node) selection of which group of UEs are best suited for MU-MIMO may be dynamic, and may rapidly change with the channel conditions as well as other scheduling considerations. Therefore, the semi-statically configured bandwidth configurations for aperiodic SRSs may lead to a significant increase of SRS resources and an increase in latency between the SRS transmission and the corresponding PDSCH transmission, as shown in example 600 of FIG. 6A.

Example 600 of FIG. 6A shows transmissions of an aperiodic SRS 602 by a first UE (UE #0) over time. As shown in FIG. 6A, a MU-MIMO PDSCH frequency allocation for UE #0 varies over time from a first MU-MIMO PDSCH frequency allocation 604 (e.g., for UE #0 and a second UE (UE #1)), to a second MU-MIMO PDSCH frequency allocation 606 (e.g., for UE #0 and a third UE (UE #2)), to a third MU-MIMO PDSCH frequency allocation 608 (e.g., for UE #0 and UE #1). As the MU-MIMO frequency allocation for UE #0 varies over time, the aperiodic SRS 602 for UE #0 may be configured (e.g., semi-statically configured via RRC signaling) with a large bandwidth configuration. As shown in FIG. 6A, the SRS signals shown by box 610 are not required for the first MU-MIMO PDSCH frequency allocation 604 for UE #0. The SRS signals shown by box 612 are not required for the second MU-MIMO PDSCH frequency allocation 606 for UE #0. The SRS signals shown by boxes 614 and 616 are not required for the third MU-MIMO PDSCH frequency allocation 608 for UE #0. Accordingly, UE #0 may be using a significantly more SRS resources than is required for the MU-MIMO PDSCH frequency allocations of UE #0. In addition, the redundant SRS signaling shown by boxes 610, 612, 614, and 616 may block SRS transmissions of other UEs, which may be important for the MU-MIMO PDSCH allocations of the other UEs.

In some aspects, as shown by example 620 of FIG. 6B, an aperiodic SRS configuration for a UE may be dynamically configured (e.g., via DCI) for both a desired timing (e.g., slot) and a desired bandwidth. That is, a network node (e.g., the network node 110) may transmit, and a UE (e.g., the UE 120) may receive, DCI that indicates scheduling information (e.g., the desired timing) for an aperiodic SRS and a frequency bandwidth (e.g., the desired bandwidth) for the aperiodic SRS. For example, the frequency bandwidth indicated in the DCI may correspond to a MU-MIMO PDSCH frequency allocation for the UE. This will enable all the UEs that are expected to be scheduled for MU-MIMO to send SRS relevant resources prior to the expected slot of the MU-MIMO PDSCH communications for the UEs. In such examples, the semi-static SRS configuration information (e.g., carried via RRC signaling) for the aperiodic SRS may not include the bandwidth configuration. In some aspects, the semi-static SRS configuration information (e.g., carried via RRC signaling) for the aperiodic SRS may indicate one or more other SRS parameters (e.g., an SRS sequence and/or other parameters) to reduce control signaling overhead.

As shown in example 620 of FIG. 6B, a first UE (UE #0) may transmit multiple aperiodic SRSs 622, 624, and 626 over time. Each of the aperiodic SRSs 622, 624, and 626 may be triggered by respective DCI received by UE #0, and the respective DCI may dynamically indicate a respective frequency bandwidth for each of the aperiodic SRSs 622, 624, and 626. The MU-MIMO PDSCH frequency allocation for UE #0 varies over time from a first MU-MIMO PDSCH frequency allocation 628 (e.g., for UE #0 and a second UE (UE #1)), to a second MU-MIMO PDSCH frequency allocation 630 (e.g., for UE #0 and a third UE (UE #2)), to a third MU-MIMO PDSCH frequency allocation 632 (e.g., for UE #0 and UE #1). As shown in FIG. 6B, the frequency bandwidth for the aperiodic SRS 622 corresponds to the first MU-MIMO PDSCH frequency allocation 628 for UE #0, the frequency bandwidth for the aperiodic SRS 624 corresponds to the first MU-MIMO PDSCH frequency allocation 630 for UE #0, and the frequency bandwidth for the aperiodic SRS 626 corresponds to the third MU-MIMO PDSCH frequency allocation 632 for UE #0. Accordingly, as in example 620 of FIG. 6B, SRS frequency resources may be significantly reduced as compared with example 600 of FIG. 6A.

In some aspects, the dynamic configuration of the frequency bandwidth for an aperiodic SRS (e.g., via the DCI that triggers the aperiodic SRS) described in connection with FIG. 6B may be used together with the slot formats discussed in connection with FIGS. 5A-5B. For example, the DCI that includes the frequency bandwidth for the aperiodic SRS may be used to schedule the aperiodic SRS in the one or more SRS symbols of a slot format that includes one or more SRS symbols prior to one or more PUSCH symbols (e.g., a described in connection with FIG. 5B) or one or more PDSCH symbols (e.g., as described in connection with FIG. 5C), among other examples. In some other aspects, the dynamic configuration of the frequency bandwidth for an aperiodic SRS (e.g., via the DCI that triggers the aperiodic SRS) described in connection with FIG. 6B may be used independent of the slot formats discussed in connection with FIGS. 5A-5C. For example, the DCI that includes the frequency bandwidth for the aperiodic SRS may be used to schedule the aperiodic SRS in a slot associated with a legacy slot format (e.g., prior to a MU-MIMO PDSCH communication in a subsequent slot associated with a legacy slot format) and/or another slot format other than slot formats discussed in connection with FIGS. 5A-5C.

As indicated above, FIGS. 6A-6B are provided as examples. Other examples may differ from what is described with respect to FIGS. 6A-6B.

Figure 7:
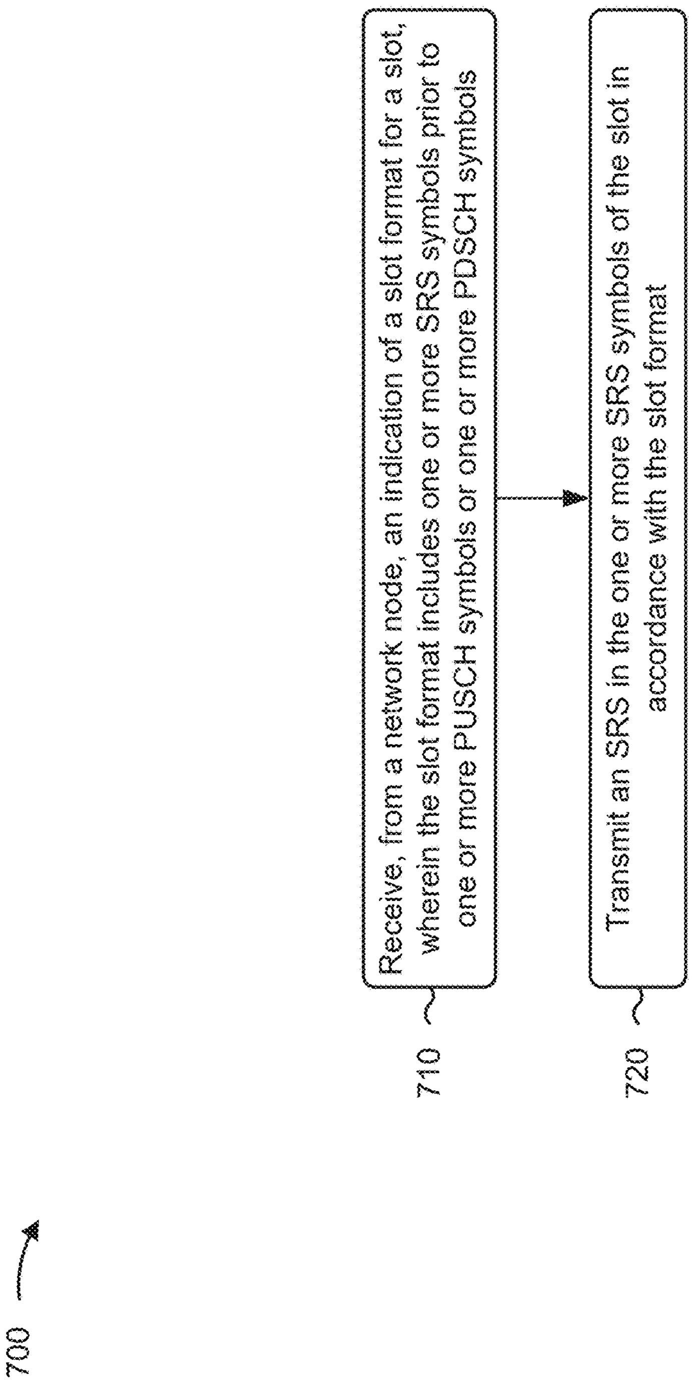
FIG. 7 is a diagram illustrating an example process performed, for example, at a UE or an apparatus of a UE, in accordance with the present disclosure.

FIG. 7 is a diagram illustrating an example process 700 performed, for example, at a UE or an apparatus of a UE, in accordance with the present disclosure. Example process 700 is an example where the apparatus or the UE (e.g., UE 120) performs operations associated with SRS configurations for fast beamforming refinement and MU-MIMO support.

As shown in FIG. 7, in some aspects, process 700 may include receiving, from a network node, an indication of a slot format for a slot, wherein the slot format includes one or more SRS symbols prior to one or more PUSCH symbols or PDSCH symbols (block 710). For example, the UE (e.g., using reception component 902 and/or communication manager 906, depicted in FIG. 9) may receive, from a network node, an indication of a slot format for a slot, wherein the slot format includes one or more SRS symbols prior to one or more PUSCH symbols or one or more PDSCH symbols, as described above.

As further shown in FIG. 7, in some aspects, process 700 may include transmitting an SRS in the one or more SRS symbols of the slot in accordance with the slot format (block 720). For example, the UE (e.g., using transmission component 904 and/or communication manager 906, depicted in FIG. 9) may transmit an SRS in the one or more SRS symbols of the slot in accordance with the slot format, as described above.

Process 700 may include additional aspects, such as any single aspect or any combination of aspects described below and/or in connection with one or more other processes described elsewhere herein.

In a first aspect, the slot format includes the one or more SRS symbols prior to the one or more PUSCH symbols.

In a second aspect, alone or in combination with the first aspect, the one or more SRS symbols are a number of symbols starting at a beginning of the slot format.

In a third aspect, alone or in combination with one or more of the first and second aspects, process 700 includes transmitting an uplink communication in the one or more PUSCH symbols of the slot in accordance with the slot format.

In a fourth aspect, alone or in combination with one or more of the first through third aspects, the slot format includes the one or more SRS symbols prior to the one or more PDSCH symbols.

In a fifth aspect, alone or in combination with one or more of the first through fourth aspects, the slot format includes the one or more SRS symbols, starting at a beginning of the slot format, followed by the one or more PDSCH symbols.

In a sixth aspect, alone or in combination with one or more of the first through fifth aspects, the slot format includes the one or more SRS symbols starting at a beginning of the slot format, one or more PDCCH symbols subsequent to the one or more SRS symbols, and the one or more PDSCH symbols subsequent to the one or more PDCCH symbols.

In a seventh aspect, alone or in combination with one or more of the first through sixth aspects, the slot format includes one or more PDCCH symbols starting at a beginning of the slot format, a gap symbol subsequent to the one or more PDCCH symbols, the one or more SRS symbols subsequent to the gap symbol, and the one or more PDSCH symbols subsequent to the one or more SRS symbols.

In an eighth aspect, alone or in combination with one or more of the first through seventh aspects, process 700 includes receiving, in the one or more PDCCH symbols of the slot in accordance with the slot format, DCI indicating one or more SRS parameters of the SRS.

In a ninth aspect, alone or in combination with one or more of the first through eighth aspects, the SRS is an aperiodic SRS, and further comprising receiving, in another slot prior to the slot, DCI indicating one or more SRS parameters of the SRS.

In a tenth aspect, alone or in combination with one or more of the first through ninth aspects, process 700 includes receiving a downlink communication in the one or more PDSCH symbols of the slot in accordance with the slot format.

In an eleventh aspect, alone or in combination with one or more of the first through tenth aspects, the SRS is a periodic SRS.

In a twelfth aspect, alone or in combination with one or more of the first through eleventh aspects, the SRS is an aperiodic SRS.

In a thirteenth aspect, alone or in combination with one or more of the first through twelfth aspects, process 700 includes receiving DCI indicating scheduling information for the SRS and a frequency bandwidth for the SRS.

In a fourteenth aspect, alone or in combination with one or more of the first through thirteenth aspects, the frequency bandwidth for the SRS corresponds to an MU-MIMO PDSCH frequency allocation associated with the UE.

In a fifteenth aspect, alone or in combination with one or more of the first through fourteenth aspects, process 700 includes receiving, via RRC signaling, SRS configuration information indicating one or more SRS parameters, other than the scheduling information and the frequency bandwidth, for the SRS.

In a sixteenth aspect, alone or in combination with one or more of the first through fifteenth aspects, the one or more SRS symbols include at least one SRS symbol in a downlink band associated with an FDD cell.

In a seventeenth aspect, alone or in combination with one or more of the first through sixteenth aspects, process 700 includes transmitting capability information indicating at least one of whether the UE supports SRS transmission in the downlink band, or whether the UE supports SRS transmission in the downlink band during uplink transmission in an uplink band associated with the FDD cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
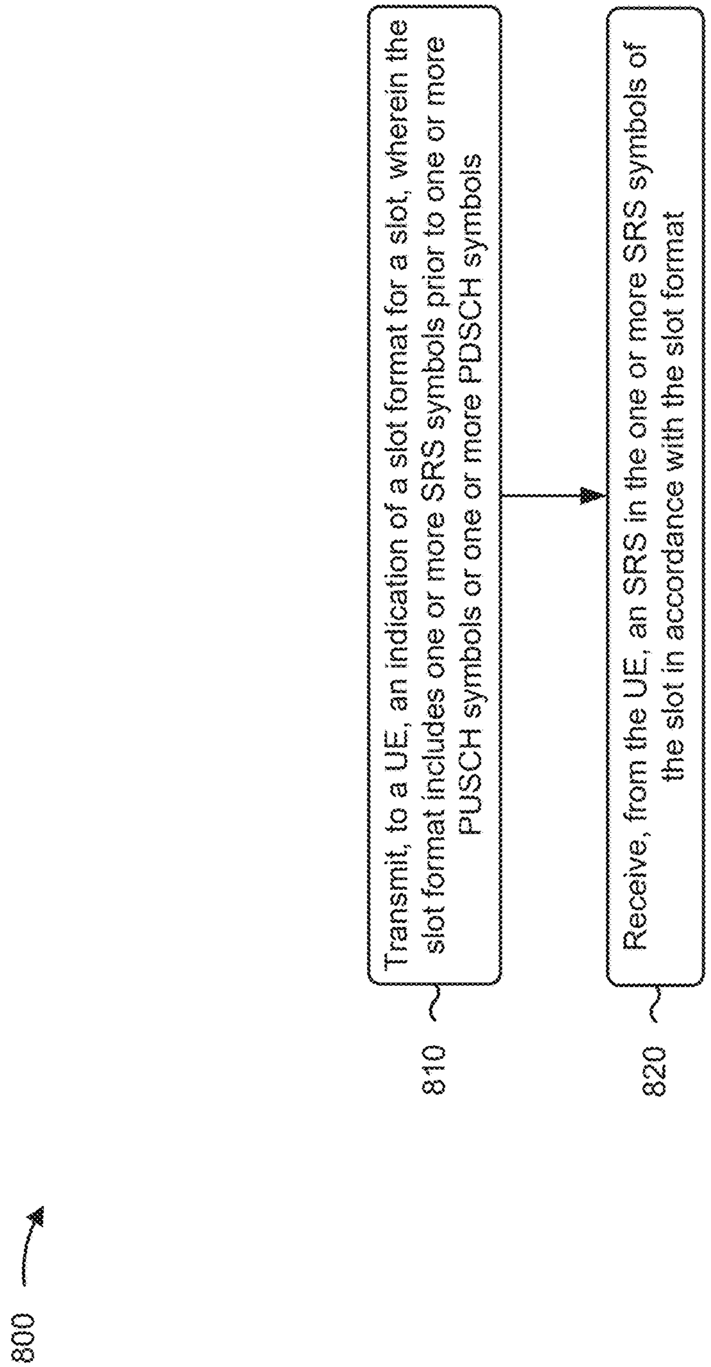
FIG. 8 is a diagram illustrating an example process performed, for example, at a network node or an apparatus of a network node, in accordance with the present disclosure.

FIG. 8 is a diagram illustrating an example process 800 performed, for example, at a network node or an apparatus of a network node, in accordance with the present disclosure. Example process 800 is an example where the apparatus or the network node (e.g., network node 110) performs operations associated with SRS configurations for fast beamforming refinement and MU-MIMO support.

As shown in FIG. 8, in some aspects, process 800 may include transmitting, to a UE, an indication of a slot format for a slot, wherein the slot format includes one or more SRS symbols prior to one or more PUSCH symbols or one or more PDSCH symbols (block 810). For example, the network node (e.g., using transmission component 1004 and/or communication manager 1006, depicted in FIG. 10) may transmit, to a UE, an indication of a slot format for a slot, wherein the slot format includes one or more SRS symbols prior to one or more PUSCH symbols or one or more PDSCH symbols, as described above.

As further shown in FIG. 8, in some aspects, process 800 may include receiving, from the UE, an SRS in the one or more SRS symbols of the slot in accordance with the slot format (block 820). For example, the network node (e.g., using reception component 1002 and/or communication manager 1006, depicted in FIG. 10) may receive, from the UE, an SRS in the one or more SRS symbols of the slot in accordance with the slot format, as described above.

Process 800 may include additional aspects, such as any single aspect or any combination of aspects described below and/or in connection with one or more other processes described elsewhere herein.

In a first aspect, the slot format includes the one or more SRS symbols prior to the one or more PUSCH symbols.

In a second aspect, alone or in combination with the first aspect, the one or more SRS symbols are a number of symbols starting at a beginning of the slot format.

In a third aspect, alone or in combination with one or more of the first and second aspects, process 800 includes receiving, in the one or more PUSCH symbols of the slot in accordance with the slot format, an uplink communication using an uplink receive beam based at least in part on the SRS.

In a fourth aspect, alone or in combination with one or more of the first through third aspects, the slot format includes the one or more SRS symbols prior to the one or more PDSCH symbols.

In a fifth aspect, alone or in combination with one or more of the first through fourth aspects, the slot format includes the one or more SRS symbols, starting at a beginning of the slot format, followed by the one or more PDSCH symbols.

In a sixth aspect, alone or in combination with one or more of the first through fifth aspects, the slot format includes the one or more SRS symbols starting at a beginning of the slot format, one or more PDCCH symbols subsequent to the one or more SRS symbols, and the one or more PDSCH symbols subsequent to the one or more PDCCH symbols.

In a seventh aspect, alone or in combination with one or more of the first through sixth aspects, the slot format includes one or more PDCCH symbols starting at a beginning of the slot format, a gap symbol subsequent to the one or more PDCCH symbols, the one or more SRS symbols subsequent to the gap symbol, and the one or more PDSCH symbols subsequent to the one or more SRS symbols.

In an eighth aspect, alone or in combination with one or more of the first through seventh aspects, process 800 includes transmitting, in the one or more PDCCH symbols of the slot in accordance with the slot format, DCI indicating one or more SRS parameters of the SRS.

In a ninth aspect, alone or in combination with one or more of the first through eighth aspects, the SRS is an aperiodic SRS, and further comprising transmitting, in another slot prior to the slot, DCI indicating one or more SRS parameters of the SRS.

In a tenth aspect, alone or in combination with one or more of the first through ninth aspects, process 800 includes transmitting, in the one or more PDSCH symbols of the slot in accordance with the slot format, a downlink communication using a downlink transmit beam based at least in part on the SRS.

In an eleventh aspect, alone or in combination with one or more of the first through tenth aspects, the SRS is a periodic SRS.

In a twelfth aspect, alone or in combination with one or more of the first through eleventh aspects, the SRS is an aperiodic SRS.

In a thirteenth aspect, alone or in combination with one or more of the first through twelfth aspects, process 800 includes transmitting DCI indicating scheduling information for the SRS and a frequency bandwidth for the SRS.

In a fourteenth aspect, alone or in combination with one or more of the first through thirteenth aspects, the frequency bandwidth for the SRS corresponds to a multi-user MU-MIMO PDSCH frequency allocation associated with the UE.

In a fifteenth aspect, alone or in combination with one or more of the first through fourteenth aspects, process 800 includes transmitting, via RRC signaling, SRS configuration information indicating one or more SRS parameters, other than the scheduling information and the frequency bandwidth, for the SRS.

In a sixteenth aspect, alone or in combination with one or more of the first through fifteenth aspects, the one or more SRS symbols include at least one SRS symbol in a downlink band associated with an FDD cell.

In a seventeenth aspect, alone or in combination with one or more of the first through sixteenth aspects, process 800 includes receiving capability information indicating at least one of whether the UE supports SRS transmission in the downlink band, or whether the UE supports SRS transmission in the downlink band during uplink transmission in an uplink band associated with the FDD cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
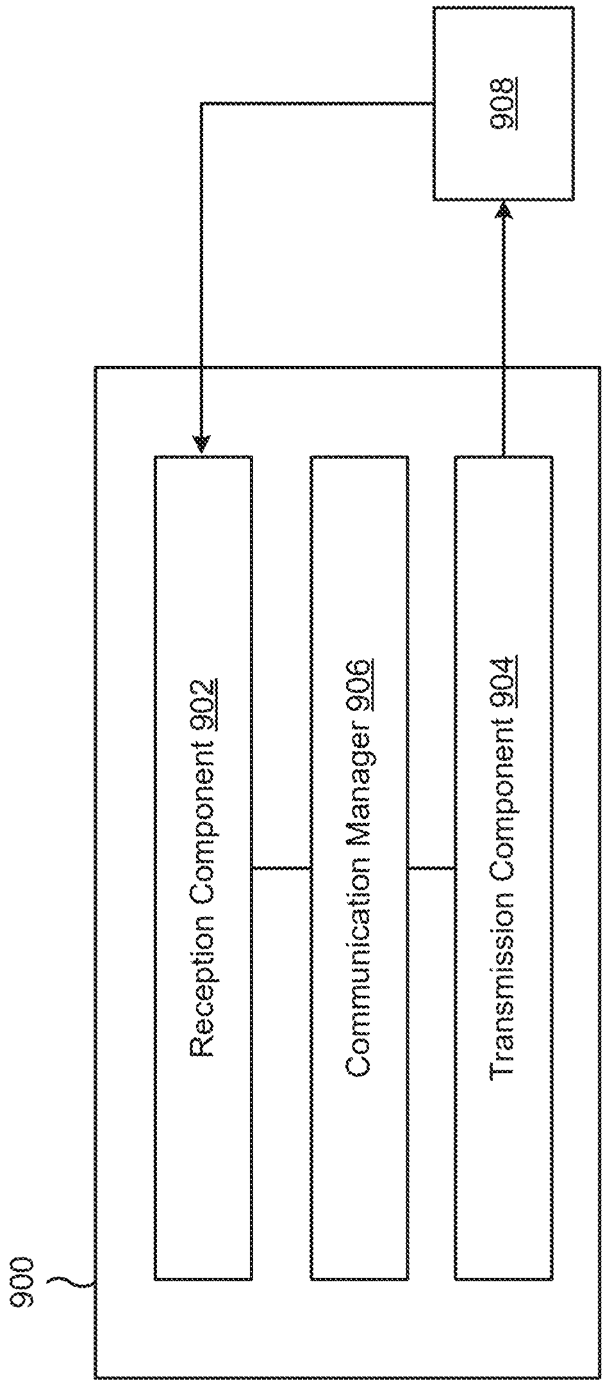
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4A-4B, 5A-5C, and 6A-6B. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a network node, an indication of a slot format for a slot, wherein the slot format includes one or more SRS symbols prior to one or more PUSCH symbols or one or more PDSCH symbols. The transmission component 904 may transmit an SRS in the one or more SRS symbols of the slot in accordance with the slot format.

The transmission component 904 may transmit an uplink communication in the one or more PUSCH symbols of the slot in accordance with the slot format.

The reception component 902 may receive, in the one or more PDCCH symbols of the slot in accordance with the slot format, DCI indicating one or more SRS parameters of the SRS.

The reception component 902 may receive, in another slot prior to the slot, DCI indicating one or more SRS parameters of the SRS.

The reception component 902 may receive a downlink communication in the one or more PDSCH symbols of the slot in accordance with the slot format.

The reception component 902 may receive DCI indicating scheduling information for the SRS and a frequency bandwidth for the SRS.

The reception component 902 may receive, via RRC signaling, SRS configuration information indicating one or more SRS parameters, other than the scheduling information and the frequency bandwidth, for the SRS.

The transmission component 904 may transmit capability information indicating at least one of whether the UE supports SRS transmission in the downlink band, or whether the UE supports SRS transmission in the downlink band during uplink transmission in an uplink band associated with the FDD cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
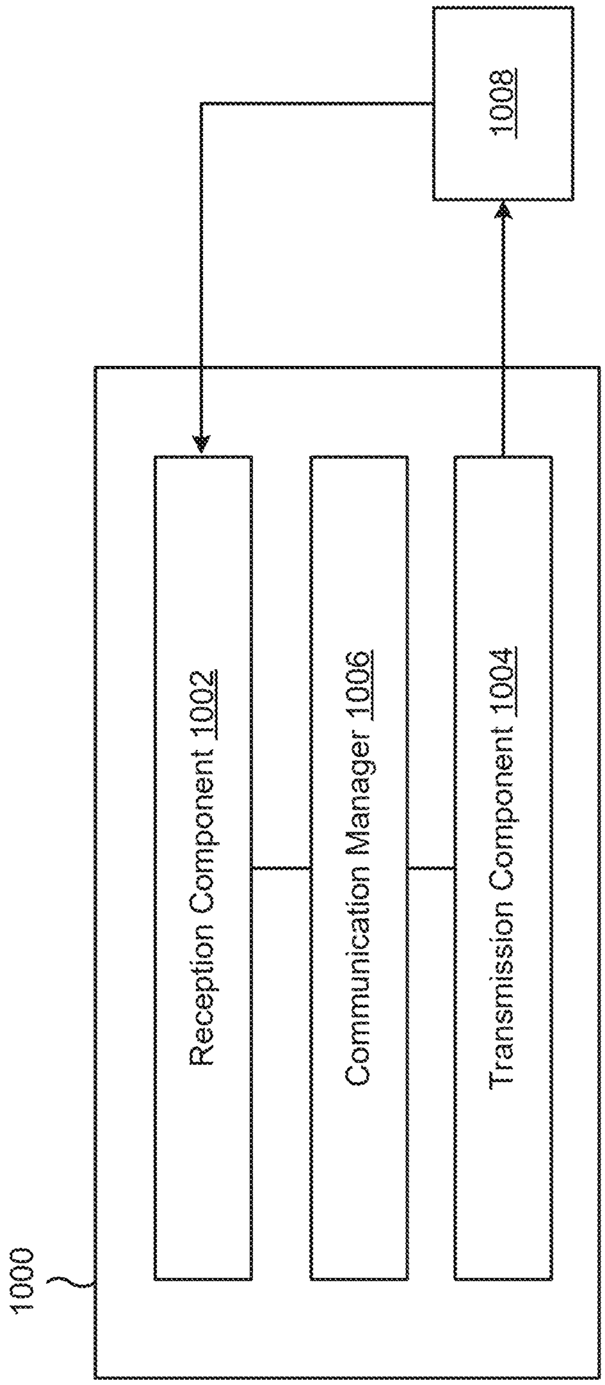
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4A-4B, 5A-5C, and 6A-6B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1002 and/or the transmission component 1004 may include or May be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a UE, an indication of a slot format for a slot, wherein the slot format includes one or more SRS symbols prior to one or more PUSCH symbols or one or more PDSCH symbols. The reception component 1002 may receive, from the UE, an SRS in the one or more SRS symbols of the slot in accordance with the slot format.

The reception component 1002 may receive, in the one or more PUSCH symbols of the slot in accordance with the slot format, an uplink communication using an uplink receive beam based at least in part on the SRS.

The transmission component 1004 may transmit, in the one or more PDCCH symbols of the slot in accordance with the slot format, DCI indicating one or more SRS parameters of the SRS.

The transmission component 1004 may transmit, in another slot prior to the slot, DCI indicating one or more SRS parameters of the SRS.

The transmission component 1004 may transmit, in the one or more PDSCH symbols of the slot in accordance with the slot format, a downlink communication using a downlink transmit beam based at least in part on the SRS.

The transmission component 1004 may transmit DCI indicating scheduling information for the SRS and a frequency bandwidth for the SRS.

The transmission component 1004 may transmit, via RRC signaling, SRS configuration information indicating one or more SRS parameters, other than the scheduling information and the frequency bandwidth, for the SRS.

The reception component 1002 may receive capability information indicating at least one of whether the UE supports SRS transmission in the downlink band, or whether the UE supports SRS transmission in the downlink band during uplink transmission in an uplink band associated with the FDD cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network node, an indication of a slot format for a slot, wherein the slot format includes one or more sounding reference signal (SRS) symbols prior to one or more physical uplink shared channel (PUSCH) symbols or one or more physical downlink shared channel (PDSCH) symbols; and transmitting an SRS in the one or more SRS symbols of the slot in accordance with the slot format.

Aspect 2: The method of Aspect 1, wherein the slot format includes the one or more SRS symbols prior to the one or more PUSCH symbols.

Aspect 3: The method of Aspect 2, wherein the one or more SRS symbols are a number of symbols starting at a beginning of the slot format.

Aspect 4: The method of any of Aspects 2-3, further comprising: transmitting an uplink communication in the one or more PUSCH symbols of the slot in accordance with the slot format.

Aspect 5: The method of any of Aspects 1-4, wherein the slot format includes the one or more SRS symbols prior to the one or more PDSCH symbols.

Aspect 6: The method of Aspect 5, wherein the slot format includes the one or more SRS symbols, starting at a beginning of the slot format, followed by the one or more PDSCH symbols.

Aspect 7: The method of any of Aspects 5-6, wherein the slot format includes: the one or more SRS symbols starting at a beginning of the slot format, one or more physical downlink control channel (PDCCH) symbols subsequent to the one or more SRS symbols, and the one or more PDSCH symbols subsequent to the one or more PDCCH symbols.

Aspect 8: The method of Aspect 5, wherein the slot format includes: one or more physical downlink control channel (PDCCH) symbols starting at a beginning of the slot format, a gap symbol subsequent to the one or more PDCCH symbols, the one or more SRS symbols subsequent to the gap symbol, and the one or more PDSCH symbols subsequent to the one or more SRS symbols.

Aspect 9: The method of Aspect 8, further comprising: receiving, in the one or more PDCCH symbols of the slot in accordance with the slot format, downlink control information (DCI) indicating one or more SRS parameters of the SRS.

Aspect 10: The method of any of Aspects 5-8, wherein the SRS is an aperiodic SRS, and further comprising: receiving, in another slot prior to the slot, downlink control information (DCI) indicating one or more SRS parameters of the SRS.

Aspect 11: The method of any of Aspects 5-10, further comprising: receiving a downlink communication in the one or more PDSCH symbols of the slot in accordance with the slot format.

Aspect 12: The method of any of Aspects 1-11, wherein the SRS is a periodic SRS.

Aspect 13: The method of any of Aspects 1-12, wherein the SRS is an aperiodic SRS.

Aspect 14: The method of Aspect 13, further comprising: receiving downlink control information (DCI) indicating scheduling information for the SRS and a frequency bandwidth for the SRS.

Aspect 15: The method of Aspect 14, wherein the frequency bandwidth for the SRS corresponds to a multi-user multiple-input multiple-output (MU-MIMO) PDSCH frequency allocation associated with the UE.

Aspect 16: The method of any of Aspects 14-15, further comprising: receiving, via radio resource control (RRC) signaling, SRS configuration information indicating one or more SRS parameters, other than the scheduling information and the frequency bandwidth, for the SRS.

Aspect 17: The method of any of Aspects 1-16, wherein the one or more SRS symbols include at least one SRS symbol in a downlink band associated with a frequency-division duplexing (FDD) cell.

Aspect 18: The method of Aspect 17, further comprising: transmitting capability information indicating at least one of: whether the UE supports SRS transmission in the downlink band, or whether the UE supports SRS transmission in the downlink band during uplink transmission in an uplink band associated with the FDD cell.

Aspect 19: A method of wireless communication performed by a network node, comprising: transmitting, to a user equipment (UE), an indication of a slot format for a slot, wherein the slot format includes one or more sounding reference signal (SRS) symbols prior to one or more physical uplink shared channel (PUSCH) symbols or one or more physical downlink shared channel (PDSCH) symbols; and receiving, from the UE, an SRS in the one or more SRS symbols of the slot in accordance with the slot format.

Aspect 20: The method of Aspect 19, wherein the slot format includes the one or more SRS symbols prior to the one or more PUSCH symbols.

Aspect 21: The method of Aspect 20, wherein the one or more SRS symbols are a number of symbols starting at a beginning of the slot format.

Aspect 22: The method of any of Aspects 20-21, further comprising: receiving, in the one or more PUSCH symbols of the slot in accordance with the slot format, an uplink communication using an uplink receive beam based at least in part on the SRS.

Aspect 23: The method of any of Aspects 19-22, wherein the slot format includes the one or more SRS symbols prior to the one or more PDSCH symbols.

Aspect 24: The method of Aspect 23, wherein the slot format includes the one or more SRS symbols, starting at a beginning of the slot format, followed by the one or more PDSCH symbols.

Aspect 25: The method of any of Aspects 23-24, wherein the slot format includes: the one or more SRS symbols starting at a beginning of the slot format, one or more physical downlink control channel (PDCCH) symbols subsequent to the one or more SRS symbols, and the one or more PDSCH symbols subsequent to the one or more PDCCH symbols.

Aspect 26: The method of Aspect 23, wherein the slot format includes: one or more physical downlink control channel (PDCCH) symbols starting at a beginning of the slot format, a gap symbol subsequent to the one or more PDCCH symbols, the one or more SRS symbols subsequent to the gap symbol, and the one or more PDSCH symbols subsequent to the one or more SRS symbols.

Aspect 27: The method of Aspect 26, further comprising: transmitting, in the one or more PDCCH symbols of the slot in accordance with the slot format, downlink control information (DCI) indicating one or more SRS parameters of the SRS.

Aspect 28: The method of any of Aspects 23-26, wherein the SRS is an aperiodic SRS, and further comprising: transmitting, in another slot prior to the slot, downlink control information (DCI) indicating one or more SRS parameters of the SRS.

Aspect 29: The method of any of Aspects 23-28, further comprising: transmitting, in the one or more PDSCH symbols of the slot in accordance with the slot format, a downlink communication using a downlink transmit beam based at least in part on the SRS.

Aspect 30: The method of any of Aspects 19-29, wherein the SRS is a periodic SRS.

Aspect 31: The method of any of Aspects 19-30, wherein the SRS is an aperiodic SRS.

Aspect 32: The method of Aspect 31, further comprising: transmitting downlink control information (DCI) indicating scheduling information for the SRS and a frequency bandwidth for the SRS.

Aspect 33: The method of Aspect 32, wherein the frequency bandwidth for the SRS corresponds to a multi-user multiple-input multiple-output (MU-MIMO) PDSCH frequency allocation associated with the UE.

Aspect 34: The method of any of Aspects 32-33, further comprising: transmitting, via radio resource control (RRC) signaling, SRS configuration information indicating one or more SRS parameters, other than the scheduling information and the frequency bandwidth, for the SRS.

Aspect 35: The method of any of Aspects 19-34, wherein the one or more SRS symbols include at least one SRS symbol in a downlink band associated with a frequency-division duplexing (FDD) cell.

Aspect 36: The method of Aspect 35, further comprising: receiving capability information indicating at least one of: whether the UE supports SRS transmission in the downlink band, or whether the UE supports SRS transmission in the downlink band during uplink transmission in an uplink band associated with the FDD cell.

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-36.

Aspect 38: An apparatus for wireless communication at a device, the apparatus comprising one or more memories and one or more processors coupled to the one or more memories, the one or more processors configured to cause the device to perform the method of one or more of Aspects 1-36.

Aspect 39: An apparatus for wireless communication, the apparatus comprising at least one means for performing the method of one or more of Aspects 1-36.

Aspect 40: A non-transitory computer-readable medium storing code for wireless communication, the code comprising instructions executable by one or more processors to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

Aspect 42: A device for wireless communication, the device comprising a processing system that includes one or more processors and one or more memories coupled with the one or more processors, the processing system configured to cause the device to perform the method of one or more of Aspects 1-36.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:
- one or more memories; and
- one or more processors, coupled to the one or more memories, configured to cause the UE to:
  - receive, from a network node, an indication of a slot format for a slot, wherein the slot format includes:
    - one or more sounding reference signal (SRS) symbols prior to one or more physical downlink shared channel (PDSCH) symbols,
    - the one or more SRS symbols starting at a beginning of the slot format,
    - one or more physical downlink control channel (PDCCH) symbols subsequent to the one or more SRS symbols, and
    - the one or more PDSCH symbols subsequent to the one or more PDCCH symbols; and
  - transmit an SRS in the one or more SRS symbols of the slot in accordance with the slot format.

2. The UE of claim 1, wherein the one or more processors are further configured to cause the UE to:
- receive an indication of another slot format for another slot, wherein the other slot format includes another one or more SRS symbols prior to one or more physical uplink shared channel (PUSCH) symbols.

3. The UE of claim 2, wherein the one or more processors are further configured to cause the UE to:
- transmit an uplink communication in the one or more PUSCH symbols of the other slot in accordance with the other slot format.

4. The UE of claim 1, wherein the one or more processors are further configured to cause the UE to:
- receive a downlink communication in the one or more PDSCH symbols of the slot in accordance with the slot format.

5. The UE of claim 1, wherein the SRS is an aperiodic SRS.

6. The UE of claim 5, wherein the one or more processors are further configured to cause the UE to:
- receive downlink control information (DCI) indicating scheduling information for the SRS and a frequency bandwidth for the SRS.

7. The UE of claim 6, wherein the frequency bandwidth for the SRS corresponds to a multi-user multiple-input multiple-output (MU-MIMO) PDSCH frequency allocation associated with the UE.

8. The UE of claim 1, wherein the one or more SRS symbols include at least one SRS symbol in a downlink band associated with a frequency-division duplexing (FDD) cell.

9. The UE of claim 8, wherein the one or more processors are further configured to cause the UE to:
- transmit capability information indicating at least one of:
  - whether the UE supports SRS transmission in the downlink band, or
  - whether the UE supports SRS transmission in the downlink band during uplink transmission in an uplink band associated with the FDD cell.

10. A network node for wireless communication, comprising:
- one or more memories; and
- one or more processors, coupled to the one or more memories, configured to cause the network node to:
  - transmit, to a user equipment (UE), an indication of a slot format for a slot, wherein the slot format includes:
    - one or more sounding reference signal (SRS) symbols prior to one or more physical downlink shared channel (PDSCH) symbols,
    - the one or more SRS symbols starting at a beginning of the slot format,
    - one or more physical downlink control channel (PDCCH) symbols subsequent to the one or more SRS symbols, and
    - the one or more PDSCH symbols subsequent to the one or more PDCCH symbols; and
  - receive, from the UE, an SRS in the one or more SRS symbols of the slot in accordance with the slot format.

11. The network node of claim 10, wherein the one or more processors are further configured to cause the network node to:
- transmit an indication of another slot format for another slot,
- wherein the other slot format includes another one or more SRS symbols prior to one or more physical uplink shared channel (PUSCH) symbols; and receive, in the one or more PUSCH symbols of the other slot in accordance with the other slot format, an uplink communication using an uplink receive beam based at least in part on the SRS.

12. The network node of claim 10, wherein the one or more processors are further configured to cause the network node to:

transmit, in the one or more PDSCH symbols of the slot in accordance with the slot format, a downlink communication using a downlink transmit beam based at least in part on the SRS.

13. The network node of claim 10, wherein the SRS is an aperiodic SRS, and wherein the one or more processors are further configured to cause the network node to:

transmit downlink control information (DCI) indicating scheduling information for the SRS and a frequency bandwidth for the SRS.

14. The network node of claim 13, wherein the frequency bandwidth for the SRS corresponds to a multi-user multiple-input multiple-output (MU-MIMO) PDSCH frequency allocation associated with the UE.

15. A method of wireless communication performed by a user equipment (UE), comprising:

receiving, from a network node, an indication of a slot format for a slot, wherein the slot format includes one or more sounding reference signal (SRS) symbols prior to one or more physical downlink shared channel (PDSCH) symbols;

receiving downlink control information (DCI) indicating scheduling information for an SRS and a frequency bandwidth for the SRS, wherein the frequency bandwidth for the SRS corresponds to a multi-user multiple-input multiple-output (MU-MIMO) PDSCH frequency allocation associated with the UE; and transmitting the SRS in the one or more SRS symbols of the slot in accordance with the slot format.

16. The method of claim 15, further comprising:

receiving an indication of another slot format for another slot, wherein the other slot format includes another one or more SRS symbols prior to one or more physical uplink shared channel (PUSCH) symbols.

17. The method of claim 16, further comprising:

transmitting an uplink communication in the one or more PUSCH symbols of the other slot in accordance with the other slot format.

18. The method of claim 15, wherein the slot format includes:

the one or more SRS symbols starting at a beginning of the slot format, one or more physical downlink control channel (PDCCH) symbols subsequent to the one or more SRS symbols, and the one or more PDSCH symbols subsequent to the one or more PDCCH symbols.

19. The method of claim 15, further comprising:

receiving a downlink communication in the one or more PDSCH symbols of the slot in accordance with the slot format.

20. The method of claim 15, wherein the SRS is an aperiodic SRS.

* * * * *